(12) United States Patent
Shareef et al.

(10) Patent No.: US 7,731,798 B2
(45) Date of Patent: Jun. 8, 2010

(54) HEATED CHUCK FOR LASER THERMAL PROCESSING

(75) Inventors: Iqbal A. Shareef, Fremont, CA (US);
Igor Landau, Palo Alto, CA (US);
David A. Markle, Saratoga, CA (US);
Somit Talwar, Los Gatos, CA (US);
Michael O. Thompson, Ithaca, NY (US); Ivelin A. Angelov, Sunnyvale, CA (US); Senquan Zhou, San Jose, CA (US)

(73) Assignee: Ultratech, Inc., San Jose, CA (US)

( * ) Notice: Subject to any disclaimer, the term of this patent is extended or adjusted under 35 U.S.C. 154(b) by 321 days.

(21) Appl. No.: 11/001,954

(22) Filed: Dec. 1, 2004

(65) Prior Publication Data
US 2006/0113290 A1   Jun. 1, 2006

(51) Int. Cl.
*C23C 16/00* (2006.01)
(52) U.S. Cl. ............ 118/725; 118/59; 156/345.52; 156/345.53; 219/443.1; 219/446.1; 219/448.11
(58) Field of Classification Search ............ 219/158, 219/121.82–121.84, 443.1, 444.1, 445.1, 219/446.1, 449.11, 543, 544, 546, 548, 121.65; 279/128, 3; 361/233, 234; 118/724, 725, 118/59; 156/345.52, 345.53
See application file for complete search history.

(56) References Cited

U.S. PATENT DOCUMENTS

| | | | | |
|---|---|---|---|---|
| 4,117,712 A | * | 10/1978 | Hager, Jr. | 374/9 |
| 4,688,540 A | * | 8/1987 | Ono | 125/13.01 |
| 5,191,506 A | * | 3/1993 | Logan et al. | 361/234 |
| 5,192,849 A | * | 3/1993 | Moslehi | 219/121.43 |
| 5,493,987 A | * | 2/1996 | McDiarmid et al. | 117/102 |
| 5,671,116 A | * | 9/1997 | Husain | 361/234 |
| 5,835,334 A | * | 11/1998 | McMillin et al. | 361/234 |

(Continued)

FOREIGN PATENT DOCUMENTS

DE        003607532 A1 *  9/1987

(Continued)

*Primary Examiner*—Samuel M Heinrich
(74) *Attorney, Agent, or Firm*—Allston L. Jones; Peters Verny, LLP

(57) ABSTRACT

A chuck for supporting a wafer and maintaining a constant background temperature across the wafer during laser thermal processing (LTP) is disclosed. The chuck includes a heat sink and a thermal mass in the form of a heater module. The heater module is in thermal communication with the heat sink, but is physically separated therefrom by a thermal insulator layer. The thermal insulator maintains a substantially constant power loss at least equal to the maximum power delivered by the laser, less that lost by radiation and convection. A top plate is arranged atop the heater module, supports the wafer to be processed, and provides a contamination barrier. The heater module is coupled to a power supply that is adapted to provide varying amounts of power to the heater module to maintain the heater module at the constant background temperature even when the wafer experiences a spatially and temporally varying heat load from an LTP laser beam. Thus, heat from the laser is transferred from the wafer to the heat sink via the heater module and the insulator layer. In the absence of any laser heating, heat is also transferred from the heater module to the wafer as needed to maintain the constant background temperature.

36 Claims, 16 Drawing Sheets

U.S. PATENT DOCUMENTS

| | | | |
|---|---|---|---|
| 6,019,164 A * | 2/2000 | Getchel et al. | 165/80.1 |
| 6,084,215 A * | 7/2000 | Furuya et al. | 219/444.1 |
| 6,307,184 B1 * | 10/2001 | Womack et al. | 219/390 |
| 6,366,308 B1 | 4/2002 | Hawryluk et al. | 347/256 |
| 6,375,749 B1 * | 4/2002 | Boydston et al. | 118/728 |
| 6,392,745 B1 * | 5/2002 | Mavliev et al. | 356/37 |
| 6,415,858 B1 * | 7/2002 | Getchel et al. | 165/206 |
| 6,605,955 B1 | 8/2003 | Costello et al. | 324/760 |
| 6,606,234 B1 * | 8/2003 | Divakar | 361/234 |
| 6,700,099 B2 * | 3/2004 | Cole et al. | 219/444.1 |
| 6,740,853 B1 * | 5/2004 | Johnson et al. | 219/444.1 |
| 6,747,245 B2 | 6/2004 | Talwar et al. | 219/121.8 |
| 6,753,129 B2 * | 6/2004 | Livesay et al. | 430/296 |
| 6,858,265 B2 * | 2/2005 | Redeker et al. | 427/569 |
| 6,886,976 B2 * | 5/2005 | Gaasch et al. | 374/5 |
| 7,049,841 B2 * | 5/2006 | Yamashita | 324/760 |
| 7,102,763 B2 * | 9/2006 | Ritzdorf et al. | 356/630 |
| 7,164,466 B2 * | 1/2007 | Hazelton | 355/72 |
| 7,446,020 B2 * | 11/2008 | Nakamura | 438/460 |
| 2002/0017916 A1 * | 2/2002 | Costello et al. | 324/760 |
| 2002/0066551 A1 * | 6/2002 | Stone et al. | 165/138 |
| 2002/0100282 A1 * | 8/2002 | Flanigan | 62/3.2 |
| 2002/0195058 A1 * | 12/2002 | Choi | 118/728 |
| 2004/0031779 A1 * | 2/2004 | Cahill et al. | 219/121.83 |
| 2004/0048550 A1 * | 3/2004 | Halley | 451/5 |
| 2004/0071386 A1 * | 4/2004 | Nunen et al. | 385/14 |
| 2004/0177927 A1 * | 9/2004 | Kikuchi et al. | 156/345.51 |
| 2005/0173403 A1 * | 8/2005 | Benjamin et al. | 219/444.1 |

FOREIGN PATENT DOCUMENTS

| | | | |
|---|---|---|---|
| JP | 01192149 A | * | 8/1989 |
| JP | 01192151 A | * | 8/1989 |
| JP | 404087321 A | * | 3/1992 |

* cited by examiner

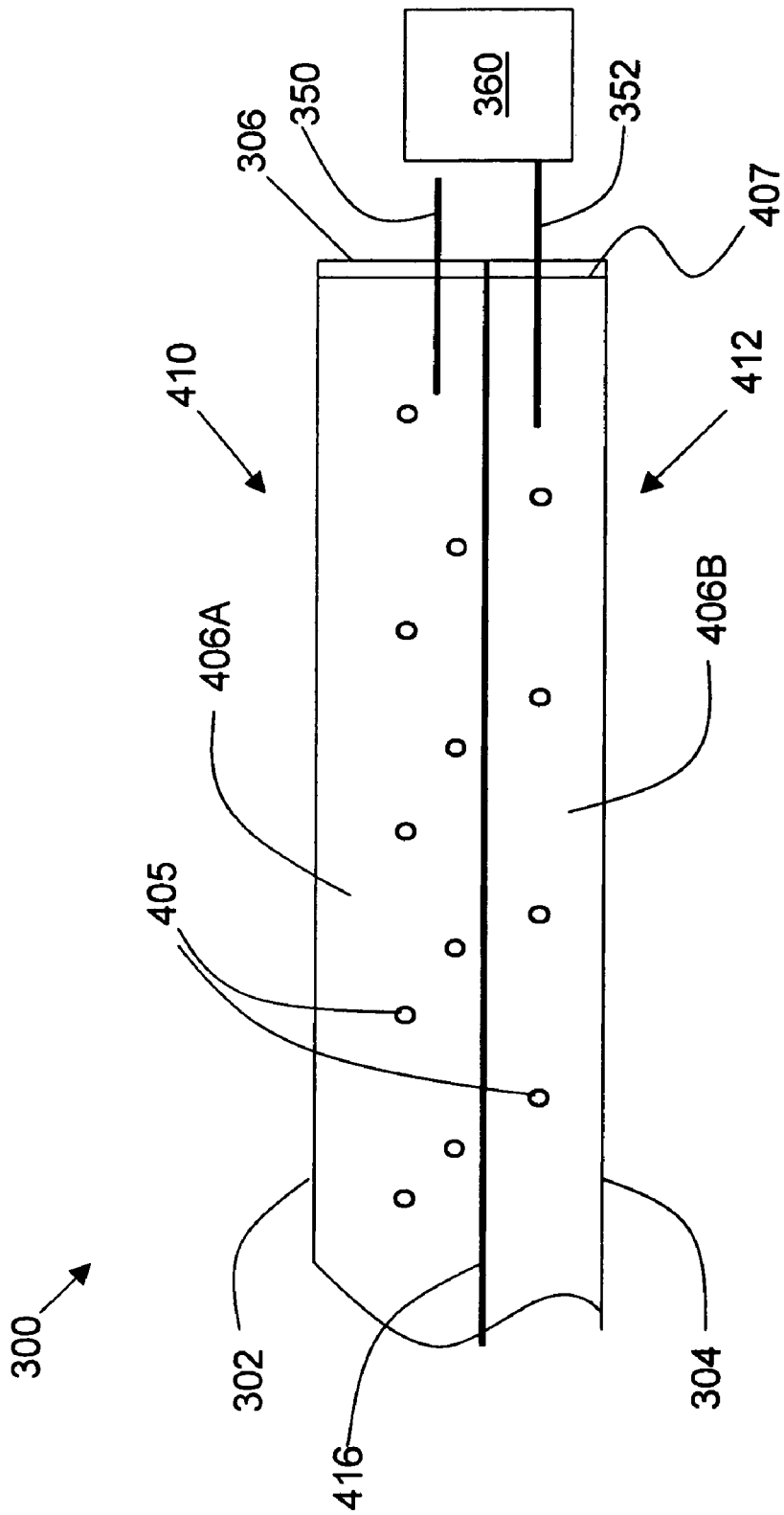

HEATED CHUCK FOR LASER THERMAL PROCESSING

CROSS-REFERENCE TO RELATED APPLICATIONS

The present invention is related to U.S. patent application Ser. No. 11/002,043, entitled "Laser Thermal Processing Chuck with Heat Pipe Heater Module," filed on Dec. 1, 2004, the same day as the current application (now issued U.S. Pat. No. 7,326,877 on Feb. 5, 2008), and each is assigned to the present Assignee, Ultratech, Inc. of San Jose, Calif., which patent application is incorporated by reference herein.

BACKGROUND OF THE INVENTION

1. Field of the Invention

The present invention relates to apparatus and methods for thermally processing semiconductor substrates in semiconductor manufacturing, and in particular relates to support members ("chucks") for supporting a semiconductor substrate during laser thermal processing (LTP).

2. Description of the Prior Art

The fabrication of integrated circuits (ICs) involves subjecting a semiconductor substrate to numerous processes, such as photoresist coating, photolithographic exposure, photoresist development, etching, polishing, and in some cases heating or "thermal processing". Thermal processing is used, for example, to activate dopants in doped regions (e.g., source and drain regions) of the wafer for certain types of ICs. Thermal processing includes various heating (and cooling) techniques, such as rapid thermal annealing (RTA) and laser thermal processing (LTP).

Various techniques and systems for performing LTP of semiconductor substrates ("wafers") are known and are used in semiconductor device manufacturing. Example LTP systems and methods are described in U.S. Pat. No. 6,747,245 entitled "Laser Scanning Apparatus and Methods for Thermal Processing" (the '245 Patent), and in U.S. Pat. No. 6,366,308 B1, entitled "Laser Thermal Processing Apparatus and Method" (the '308 Patent), which patents are incorporated by reference herein.

LTP involves rapidly bringing the temperature of the wafer up to the annealing temperature and then rapidly back down to the starting (e.g., ambient or background) temperature in a single cycle. Because of the relatively large sizes of the typical wafer used in semiconductor manufacturing (e.g., 300 mm in diameter), the heat is more efficiently applied to only a small region of the wafer at a given time.

For example, as described in the '245 Patent and the '308 Patent, a laser beam forms a narrow high-intensity image (e.g., a line image) that is scanned over the wafer surface, e.g., in a raster pattern. This process can involve a heat flux in excess of 1000 W/mm$^2$ over the narrow image. The peak temperature TP reached by the wafer surface at the region being irradiated during LTP is relatively high (e.g., ~1,300° C.).

The uniformity of the peak temperature TP determines the sheet resistance uniformity of activated doped regions formed therein, which in turn determines the performance of resulting semiconductor devices.

Attaining a uniform peak temperature TP over the wafer depends on the stability of the laser power and on the temperature uniformity of the wafer surface (referred to hereinbelow as the "background wafer temperature"). Maintaining a constant background temperature of the wafer, however, is problematic when the LTP process utilizes a spatially varying thermal load such as a scanned laser beam.

SUMMARY OF THE INVENTION

The present invention includes a chuck adapted to maintain a constant background wafer temperature TC even when the wafer is subject to a temporally varying thermal load from an LTP laser beam. The present invention accomplishes this by employing an insulator layer located between a heater module held at a constant temperature and a heat sink. The insulator layer is designed to maintain a thermal gradient between the heater module and the heat sink, which removes more heat than that supplied by the laser, less the normal radiative and convective losses from the wafer and chuck.

The chuck is capable of accommodating a large, spatially varying, thermal load on the wafer, caused from scanning an LTP laser beam repeatedly across the wafer surface, without significant changes to the wafer background temperature as seen by the leading edge of the scanned LTP laser beam. Generally the LTP laser beam power and the scan velocity are kept constant. This keeps constant the maximum (peak) temperature TP generated seen by each point of the wafer as the trailing edge of the LTP laser beam passes over it.

Accordingly, a first aspect of the invention is a chuck apparatus for supporting a wafer and maintaining it at a constant background temperature when the wafer is subject to a radiation intensity that varies spatially and temporally. The apparatus includes a heat sink, and a heater module conductively coupled to the wafer and adapted to provide tight temperature control at the constant background temperature when the wafer is subject to the varying radiation flux. The apparatus also includes a thermal insulator layer arranged between and in thermal communication with the heat sink and the heater module. The insulator layer adapted to maintain (i.e., sustain) a substantially constant flow of heat from the heater module to the heat sink.

A second aspect of the invention is a method of maintaining a wafer at a constant background temperature when the wafer is subject to a varying thermal load. The method includes placing the wafer in thermal communication with a heater module, the heater module being adapted to generate a variable amount of heat and transferring a relatively constant amount of heat to a heat sink. The method also includes placing the heat sink in thermal communication with the heater module through an insulator layer. The insulator layer is adapted to maintain a substantially constant flow of heat between the heat sink and the heater module. The method further includes maintaining the heater module at the constant background temperature by supplying varying amounts of power to the module.

A third aspect of the invention is a laser thermal processing (LTP) system for processing a wafer. The system includes a laser source that emits laser radiation, and an optical system adapted to receive the laser radiation and form an LTP laser beam image at an image plane. The system also includes a movable stage adapted to support a chuck, which is adapted to support the wafer so that the upper surface of the wafer lies in the image plane. The chuck includes a heater module in thermal communication with the wafer and adapted to be maintained at a constant temperature when the wafer upper surface is subject to a varying heat load from the LTP laser beam. The chuck also includes a heat sink in thermal communication with the heater module through an insulator layer, wherein the insulator layer is adapted to maintain a constant power loss corresponding to a maximum of the varying heat load.

BRIEF DESCRIPTION OF THE DRAWINGS

FIG. 4D is close-up cross-sectional view of a portion of the top plate of FIG. 2 illustrating an example embodiment of a top plate that has upper and lower sections made of porous material and separated by a non-porous layer, and having a non-porous edge boundary to prevent edge leakage;

Figure 1:
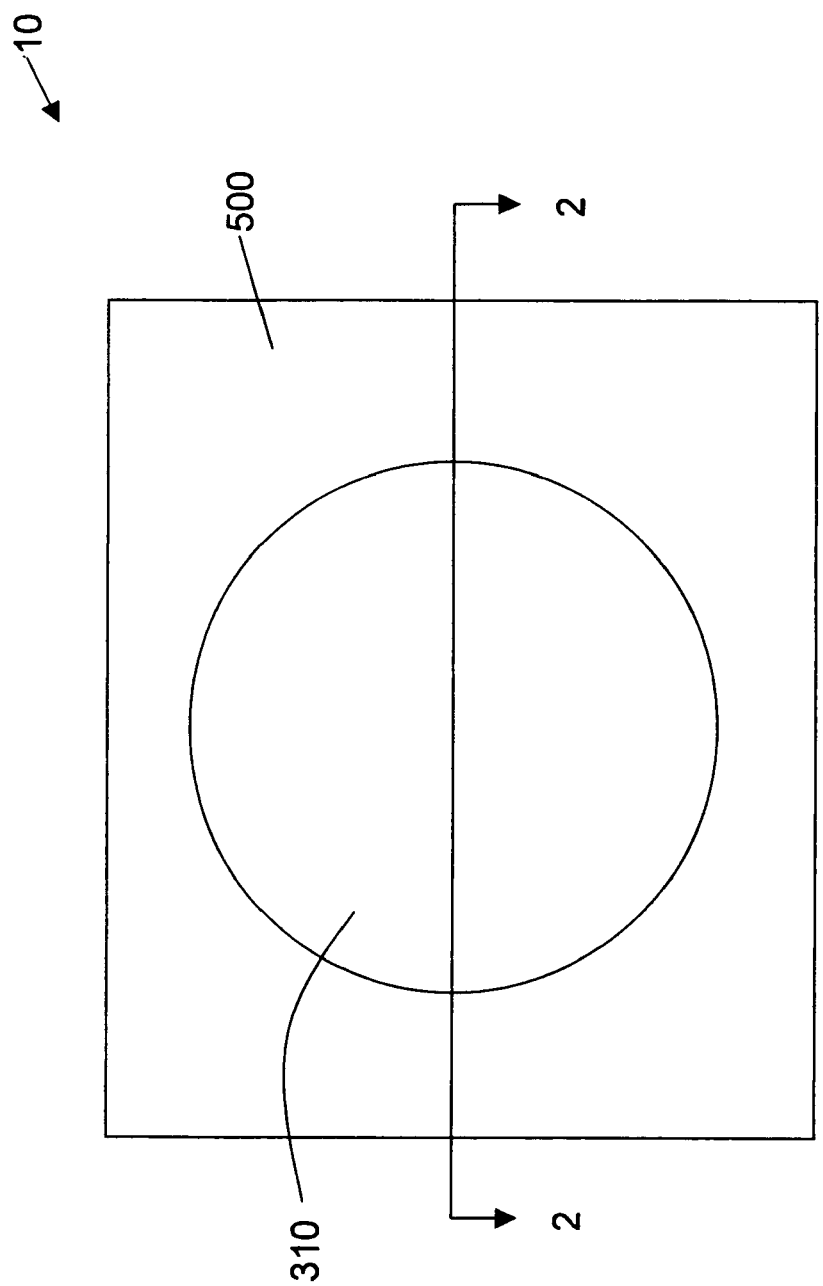
FIG. 1 is a plan view of the chuck according to the present invention.

The various elements depicted in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

DETAILED DESCRIPTION OF THE INVENTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

As mentioned above, achieving a uniform peak temperature over the wafer surface during LTP is critical in manufacturing semiconductor devices that require uniform sheet resistance of activated doped regions. Achieving peak temperature uniformity in LTP is facilitated by creating an environment wherein the wafer efficiently absorbs energy from the incident LTP laser beam. If the wafer is undoped or lightly doped, it is necessary to bring the wafer up to a constant background temperature TC prior to irradiating the wafer with the LTP laser beam in order to increase the absorption of the laser beam. Failure to do this can result in the beam passing through the wafer and to the chuck in some cases. Further, it involves maintaining the wafer at the constant background temperature TC even as the scanned LTP laser beam provides a spatially varying heat load to the wafer.

The chuck of the present invention is adapted to maintain a constant background wafer temperature TC significantly higher than room temperature even when the wafer is subject to the spatial varying thermal load from a scanned LTP laser beam. In an example embodiment, constant background temperature TC is in the range from about 400° C. to about 450° C. In one example embodiment, the constant background temperature TC is kept uniform across the wafer to +/−4° C., and in another example embodiment is kept uniform across the wafer to +/−6° C.

In the description below, the phrase "spatially varying thermal load" is used to describe the delivery of heat to different locations (positions) on the wafer at different times, e.g., by scanning an LTP laser beam (i.e., scanning the image formed by an LTP laser beam) over the wafer surface to be processed.

Also in the description below, the phrase "constant background temperature" is understood to mean "constant or substantially constant," wherein the variation in the background temperature is held to within a range that does not substantially affect the resultant LTP process. Likewise, the "constant background temperature" is assumed to be substantially uniform, i.e., is uniform over the wafer to the degree necessary to perform LTP of the wafer without substantial adverse results.

The description below sets forth various example embodiments of the chuck of the present invention, followed by an example embodiment of an LTP system that includes the chuck of the present invention. Methods of operation of the chuck as part of the LTP system are then set forth.

Chuck Embodiments

Figure 2:
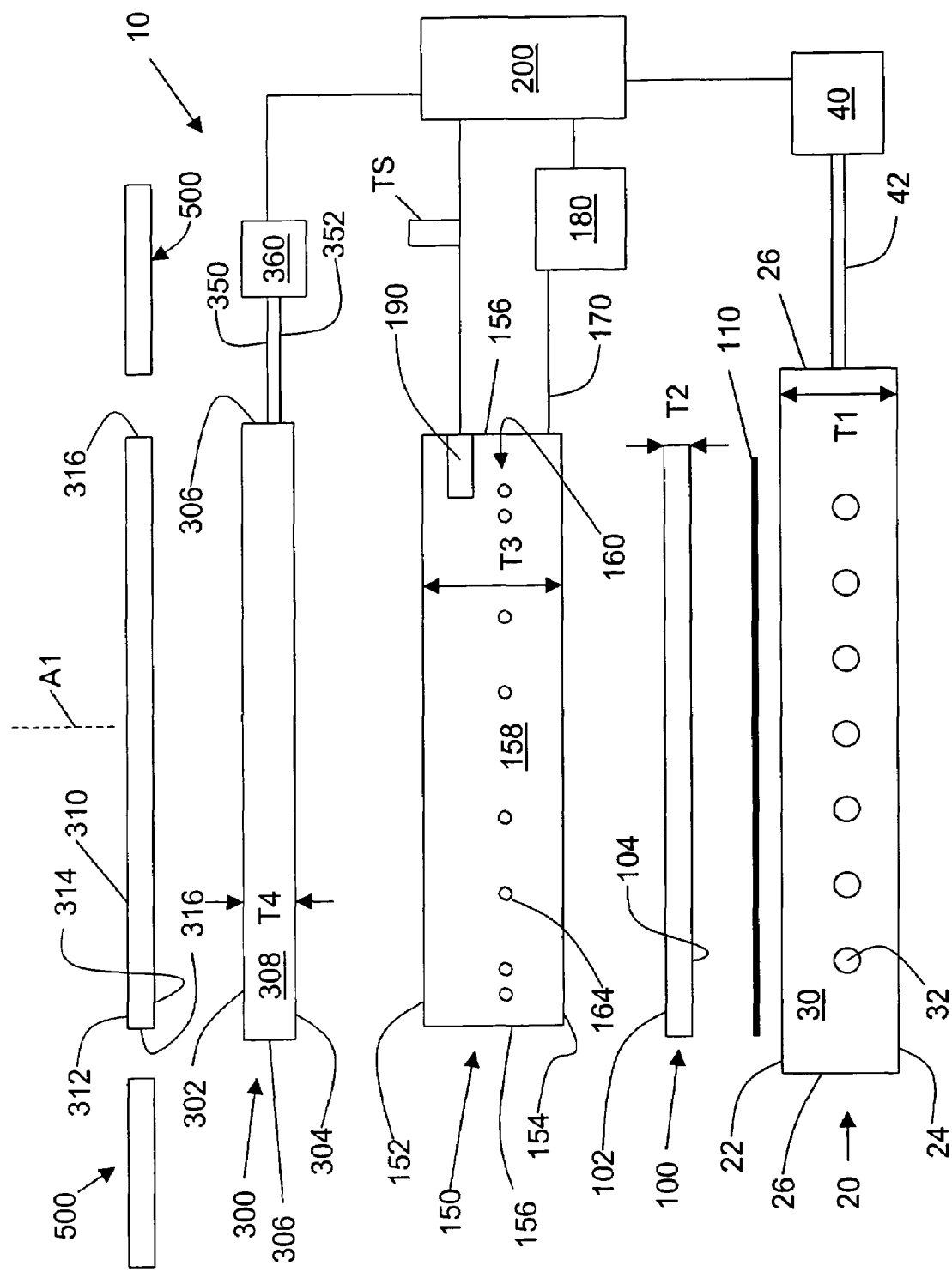
FIG. 2 is a cross-sectional exploded view of the chuck of FIG. 1 taken along the line 2-2 of FIG. 1.

FIG. 1 is a plan view of a wafer support member (hereinafter, "chuck") 10 according to the present invention. Chuck 10 supports a wafer 310 surrounded by skirt 500, discussed below in relation to FIG. 5. FIG. 2 is a cross-sectional, exploded view taken along the line 2-2 in FIG. 1. Chuck 10 is adapted to transfer large amounts of heat from the wafer surface to maintain the wafer at a constant background temperature TC during LTP. To accomplish this task, the chuck is designed to transfer heat efficiently from the wafer surface through a thermally conducting heater module, through an insulator layer and to a heat sink.

The various elements constituting example embodiments of chuck 10 are described in detail below. Chuck 10 has an imaginary central axis A1 (FIG. 2) that serves as a reference for the various elements described below.

Cooling Plate

With reference to FIG. 2, chuck 10 includes a heat sink 20. For the sake of illustration, heat sink 20 is shown as and is referred to hereinbelow as a "cooling plate". Cooling plate 20 has opposing upper and lower surfaces 22 and 24, resspectively, a periphery 26 and a body (thermal mass) 30. Cooling plate 20 includes a cooling channel 32, which is formed within body 30. Cooling channel 32 is adapted to support the flow of a cooling fluid (e.g., water) through body 30 from a cooling unit 40 operably coupled to the cooling channel via cooling lines 42. In an example embodiment, cooling plate 20 has a thickness T1 of about 1.5 inches. Also in an example embodiment, cooling plate 20 is made of a good thermal conductor such as aluminum.

Insulator Layer

With continuing reference to FIG. 2, chuck 10 further includes an insulator layer 100 having opposing upper and lower surfaces 102 and 104, respectively. Insulator layer 100 is arranged such that lower surface 104 is in thermal communication with (e.g., attached to or otherwise in contact with) upper surface 22 of cooling plate 20. In an example embodiment, insulator layer 100 has a relatively low thermal conductivity, a low-mass density and excellent thermal-shock-resistance properties.

In an example embodiment, insulator layer 100 is made of quartz. In an example embodiment of a quartz insulator layer 100 includes a plate of opaque quartz LD-80, available from Pyromatics Corporation of Willoughby, Ohio.

The low mass of the insulator layer facilitates high acceleration rates of the chuck assembly that occur during scanning.

Insulator layer 100 is adapted to maintain a substantially constant thermal gradient between a heater module (discussed immediately below) and the cooling plate. The thermal conductivity of the insulator layer determines the heat transferred to the heat sink so that the wafer can always be maintained at a constant temperature by an electric heater.

In an example embodiment, insulator layer 100 has a thickness T2 of about 0.5 inches. In example embodiments, the thickness T2 of insulator layer 100 is determined by empirical analysis and/or by modeling of the thermal conductivity needed to ensure that some electrical power input is needed to maintain the desired operating temperature even when full laser power is incident of the substrate. In an example embodiment, insulator plate 100 is circular in geometry and is machined to approximately 5 μm flatness with a 0.2-0.3 μm surface finish on both the upper and lower surfaces to establish good thermal contact with the heater module and the cooling plate.

Heater Module

With continuing reference to FIG. 2, chuck 10 also includes a heater module 150 having opposing upper and lower surfaces 152 and 154, respectively, a periphery 156 and a thermally conducting body 158. Heater module 150 is arranged such that lower surface 154 is in thermal communication with (e.g., is attached to or is otherwise in contact with) upper surface 102 of insulator layer 100. In an example embodiment, heater module 150 includes a heating unit 160 embedded in body 158. In an example embodiment, heater module 150 is capable of providing 4.2 kW of heat.

Heater module 150 is also in thermal communication with cooling plate 20 through insulator layer 100, but is not in physical contact with the cooling plate.

In an example embodiment, heating unit 160 includes an insulated resistive heating element 164 embedded in body 158. In an example embodiment, heating element 164 is spiral wound in a plane parallel to upper surface 152. Heating unit 160 is configured to produce a uniform amount of heat per unit surface area (i.e., the area of upper surface 152). The exception is periphery 156, where the heat loss there is greater and so requires a heat input per unit area that is proportionately higher.

In an example embodiment, body 158 of heater module 150 is made of a good thermal conductor, such as aluminum. In an example embodiment, body 158 of heater s module 150 is cast around heating element 164 to ensure good thermal coupling between the heating element (which, in an example embodiment, has an outer jacket of stainless steel) and the heater module body. Heating unit 160 includes leads 170 that connect to a variable power supply unit ("power supply") 180. Power supply 180 is adapted to provide variable amounts of electrical power to heating unit 160 to maintain the heater module at a constant background temperature TC. In an example embodiment, heater module 150 has a thickness T3 in the range from about 0.5 inch to about 1.25 inches.

In an example embodiment, one or more temperature probes (e.g., thermocouples or thermistors) 190 are embedded in or are otherwise thermally coupled to the body 158 of heater module 150 at one or more locations. In an example embodiment, the one or more of temperature probes 190 are coupled to a chuck controller 200 that receives one or more temperature signals TS from the probes corresponding to the temperature measured at the different heater module locations. Controller 200 is also operably coupled to cooling unit 40 and to variable power supply unit 180, and is adapted (e.g., via operating instructions embodied in software) to control the operation of these units, as described in greater detail below.

Top Plate

With continuing reference to FIG. 2, chuck 10 includes a top plate 300 having opposing upper and lower surfaces 302 and 304, respectively, a perimeter 306 and a body 308. Top plate 300 is arranged so that lower surface 304 is in thermal communication with (e.g., attached to or otherwise in contact with) upper surface 152 of heater module 150. In an example embodiment, top plate 300 has a thickness T4 in the range from about 0.25 inch to about 0.5 inch.

Top plate upper surface 302 is adapted to support wafer 310. Wafer 310 has opposing upper and lower surfaces 312 and 314, respectively, and an outer edge 316. In an example embodiment, top plate 300 serves to protect wafer 310 from being contaminated by the material making up heater module 150. For example, if heater module 150 is made of aluminum, direct contact between the wafer and the aluminum would result in an undesirable transfer of aluminum atoms to a very pure silicon wafer.

Accordingly, in an example embodiment, top plate 300 is made of, or includes, a material that does not contaminate the wafer. For example, if wafer 310 is a silicon wafer, then in example embodiments top plate 300 candidate materials include at least one of fused silica, silicon and silicon carbide. In a particular example embodiment, top plate 300 includes silicon with an oxide or nitride coating on upper surface 302.

In another example embodiment, top plate 300 is a thick oxide layer, such as, $Al_2O_3$ formed atop an aluminum heater module 150.

Top Plate with Vacuum Grooves

Figure 3:
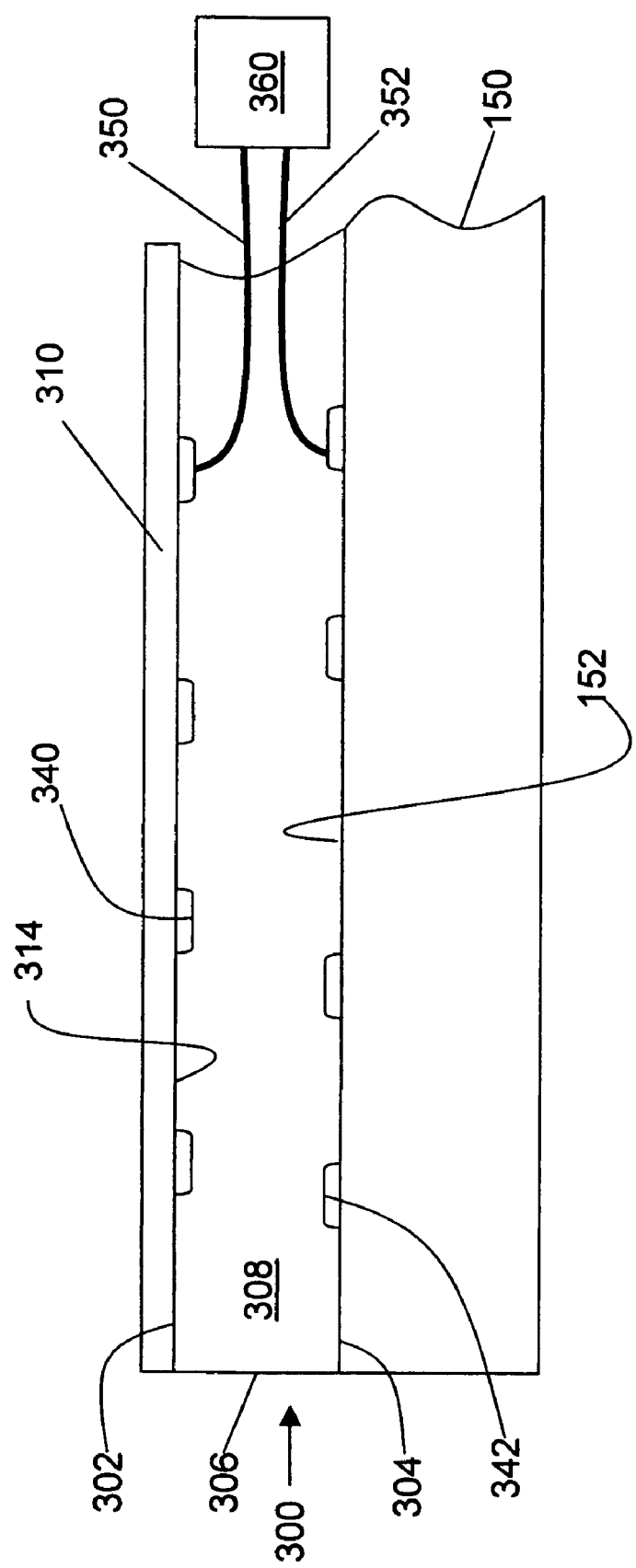
FIG. 3 is a close-up cross-sectional view of a portion of the top plate of FIG. 2 along with a portion of the wafer above and the heater module below, illustrating an example embodiment of a top plate that has vacuum grooves on its upper and lower surfaces.

FIG. 3 is a close-up cross-sectional view of a portion of top plate 300 along with a portion of wafer 310 and heater module 150. With reference to FIG. 3, in an example embodiment top plate 300 includes vacuum grooves 340 and 342 formed in upper and lower surfaces 302 and 304, respectively. In practice, the vacuum grooves in top plate 300 are made as narrow as possible, since each vacuum groove is a thermal discontinuity that might upset the uniform background temperature of the wafer. Chuck 10 also includes respective vacuum lines 350 and 352 coupled at their respective ends to respective vacuum grooves 340 and 342, and at their respective opposite ends to a vacuum system 360.

Vacuum grooves 340, in combination with vacuum line 350 and vacuum system 360, serve to provide suction at wafer 310 lower surface 314 that creates a vacuum that secures wafer 310 to top plate upper surface 302. Likewise, vacuum grooves 342, in combination with vacuum line 352 and vacuum system 360, serve to provide suction at top plate 300 lower surface 304 that creates a vacuum that secures top plate 300 to heater module 150 upper surface 152.

In order to position the top plate with respect to the heater module in the event of no vacuum, in an example embodiment are mechanical guides (not shown) used to fix the relative lateral and rotational positions of the two pieces. The mechanical guides could be, for example, two pins that engage a close fitting hole in one case, and a close fitting groove in the other.

Top Plate with Porous Central Section

Figure 4A:
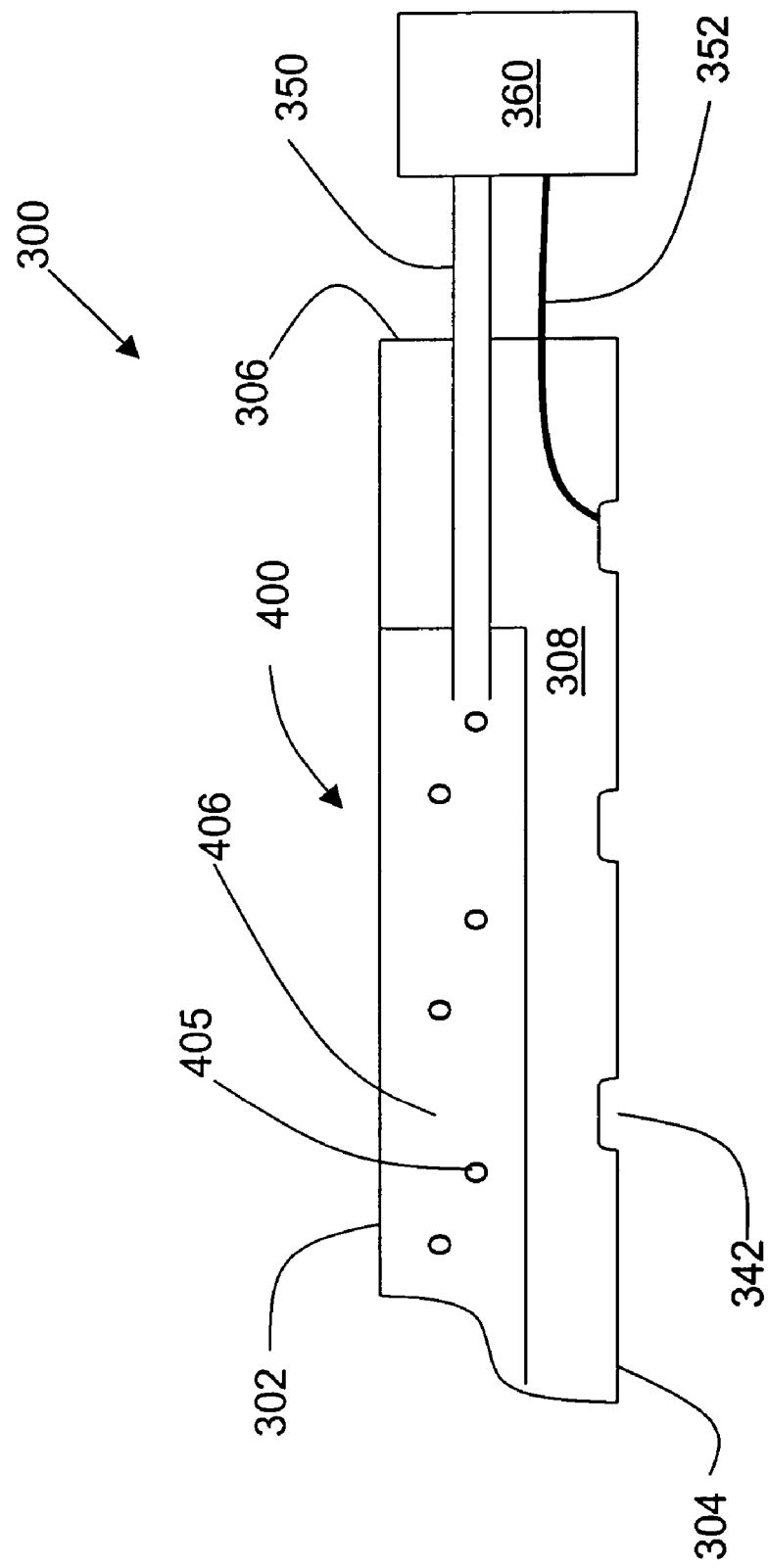
FIG. 4A is a close-up cross-sectional view of a portion of the top plate of FIG. 2, illustrating an example embodiment of a top plate that includes a material porous to air.

FIG. 4A is a cross-sectional view of a portion of top plate 300 illustrating an example embodiment wherein the top plate includes a solid material 406 porous to air and that includes pores 405. Top plate 300 of FIG. 4A includes a central recess 400 formed in upper surface 302 of body 308. Recess 400 contains solid porous material 406. In an example embodiment, porous material 406 is silicon carbide. Surrounding porous material 406 is body 308 that is non-porous to air, and in an example embodiment body 308 is formed from non-porous silicon carbide.

In this example embodiment, top plate 300 is formed from a solid silicon carbide body 308 having a recess 400 in the top of, and material 406 is in the form of a disk (e.g., a porous silicon carbide disk) that fits into recess 400 and is bonded to the portions of body 308 that surround the disk.

Vacuum line 350 is pneumatically coupled to material 406 through perimeter 306 of body 308. The porosity of material 406 obviates the need for vacuum grooves 340 (FIG. 3) to be formed in upper surface 302 in order to secure wafer 310 to top plate upper surface 302. In the present example embodiment, a suction is formed at the top plate upper surface 302 (via pores 405) when vacuum system 360 is activated. This creates a vacuum between wafer 310 and top plate 300 that secures wafer 310 to the top plate 300.

As discussed above, mechanical guides can be used to position and hold the top plate in position relative to the heater module in the case where there is no (or insufficient) vacuum.

Top Plate with Central Porous Disk

Figure 4B:
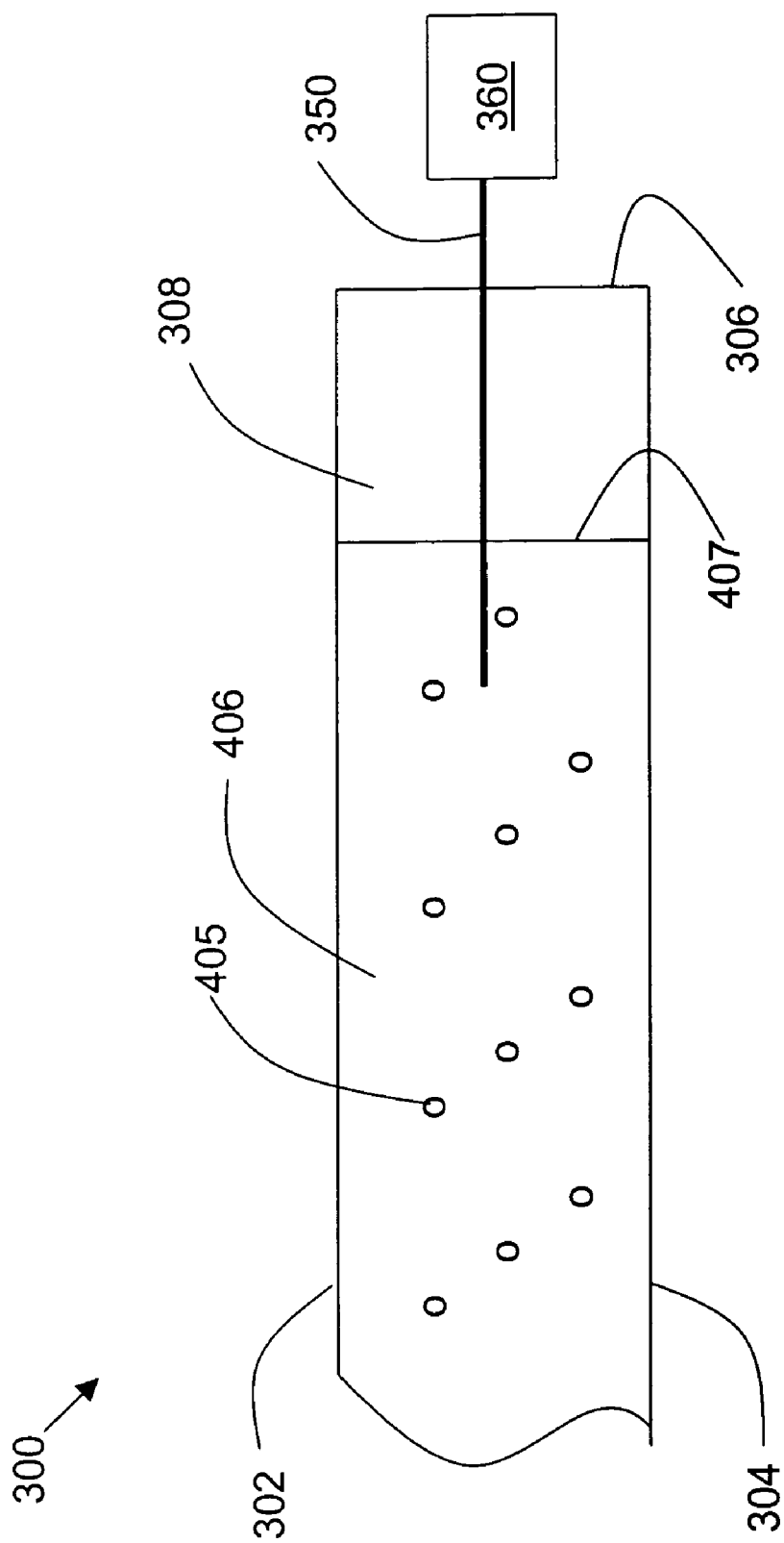
FIG. 4B is a close-up cross-sectional view of a portion of the top plate of FIG. 2, illustrating an example embodiment of a top plate having a section of porous material that extends from the upper to the lower surface of the top plate and that is surrounded at the perimeter by non-porous body.

FIG. 4B is a cross-sectional view of a portion of top plate 300 illustrating an example embodiment of the top plate that includes a section of porous material 406 that extends between the upper and lower surfaces 302 and 304 of the top plate 300. Porous material section 406 is surrounded by a non-porous body 308, e.g., in the form of a ring.

In this example embodiment, top plate 300 is formed from a disk of porous material 406 (e.g., silicon carbide) having a perimeter 407, wherein the disk is surrounded by a close-fitting solid non-porous body 308 (e.g., of non-porous silicon carbide) in the form of a ring surrounding disk perimeter 407. Disk 406 and ring 308 are bonded together at disk perimeter 407.

Vacuum line 350 is pneumatically coupled to material 406 through perimeter 306 of body 308. The porosity of material 406 obviates the need for vacuum grooves 340 and 342 to be formed in upper and lower surfaces 302 and 304 in top plate 300 as in FIG. 3 in order to secure wafer 310 to top plate upper surface 302 and to secure top plate 300 to heater module 150.

In the present example embodiment, a suction is formed at the top plate upper surface 302 (via pores 405) when vacuum system 360 is activated. This creates a vacuum between the wafer and the top plate that secures the wafer to the top plate. Likewise, a suction is formed at top plate lower surface 304, which creates a vacuum between the top plate and the heater module that secures the heater module to the top plate. With this embodiment the vacuum between the wafer and the top plate cannot be operated independently of the vacuum between the top plate and the heater module. While only vacuum line 350 is shown in FIG. 4B it should be understood that line 350 may encompass as many vacuum lines as necessary.

Top Plate Formed Entirely of Porous Material

Figure 4C:
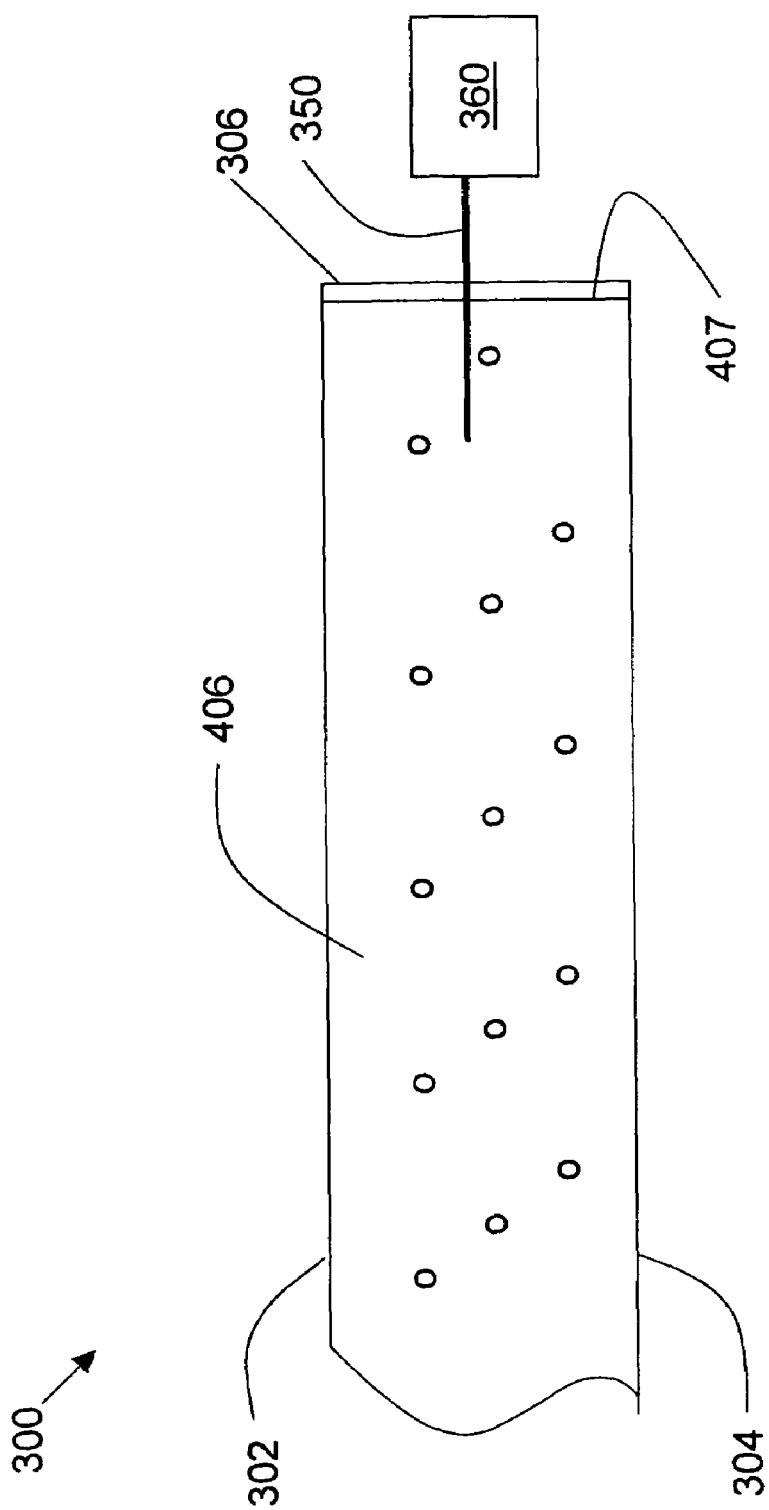
FIG. 4C is a close-up cross-sectional view of a portion of the top plate of FIG. 2, illustrating an example embodiment wherein the top plate is formed almost entirely of a porous material, with a non-porous boundary to prevent edge leakage.

FIG. 4C is a cross-sectional view of a portion of top plate 300 similar to that shown in FIG. 4B, illustrating another example embodiment of top plate 300, wherein the top plate is formed essentially entirely of porous material 406 surrounded at the perimeter 407 by a non-porous material 306 (e.g., a non-porous film). In an example embodiment, porous material 406 includes silicon carbide, which has a high thermal conductivity and is very hard.

As in the example embodiment of top plate 300 of FIG. 4B, a vacuum is formed at both the wafer-top plate interface and the top-plate heater-module interface when a vacuum is applied from vacuum system 360 (e.g., via a single vacuum line 350) due to the porosity of the top plate at both the upper and lower surfaces.

Note that with the present embodiment the vacuum between the wafer and the top plate cannot be operated independently of the vacuum between the top plate and the heater module.

The hardness of silicon carbide makes it a preferred material 406 because it minimizes wear and consequent contamination between the wafer and the top plate upper surface.

Top Plate with Two Porous Sections

FIG. 4D is a cross-sectional view of a portion of top plate 300 illustrating another example embodiment wherein the top plate includes two sections of porous material surrounded by a non-porous material at perimeter 306. The top plate 300 of FIG. 4D includes a top section 410 and a bottom section 412 formed from respective porous materials 406A and 406B. In an example embodiment, material 406A is the same as material 406B. A non-porous material 407 is included at perimeter 306 to prevent edge leakage from the porous material sections.

Sections 410 and 412 are separated by a non-porous barrier 416 and are connected to vacuum system 360 by separate vacuum lines 350 and 352. This embodiment allows vacuum system 360 to apply a vacuum independently to sections 410 and 412 to create a section at upper and lower surfaces 302 and 304, respectively.

Advantages of the Top Plate Having a Porous Material

Fabricating top plate 300 with a porous material that makes up at least a portion of upper surface 302 allows for eliminating vacuum grooves 340 (FIG. 3). This in turn eliminates perturbations in the wafer temperature caused by the presence of the vacuum grooves 340, which are not good thermal conductors.

In an example embodiment, the pore size distribution of pores 405 in material 406 is uniform (e.g., in the ~20 μm range) and is much smaller than the thermal diffusion length. This allows the high thermal resistance associated with vacuum grooves 340 to be minimized, and to be evenly spread over the entire silicon wafer surface rather than being locally confined, while also allowing for a sufficient vacuum to secure wafer 310 to top plate upper surface 302.

Optional Interface Layer

In another example embodiment, chuck 10 includes a thin, compliant, low-friction thermal interface layer 110 (FIG. 2) arranged between one or more of the interfaces in the chuck, e.g., between cooling plate upper surface 22 and insulator layer lower surface 104 (FIG. 2), and/or between insulator layer upper surface 102 and heater module lower surface 154. FIG. 2 illustrates the example embodiment wherein chuck 10 includes an interface layer 110 between cooling plate 20 and the insulator layer 100.

In such an example embodiment, interface layer 110 is made of or includes a flexible sheet of graphite material such as Grafoil®, available from American Seal and Packing Co., Fountain Valley, Calif. Interface layer 110 allows for the uneven thermal expansion of the chuck components directly on either side of layer 110. Insulator layer 110 also minimizes the thermal contact resistance due to its compliance. Interface layer 110 fills in any small irregularities at the interface between adjacent components, which ensures good thermal communication between the adjacent components.

Skirt

Figure 5:
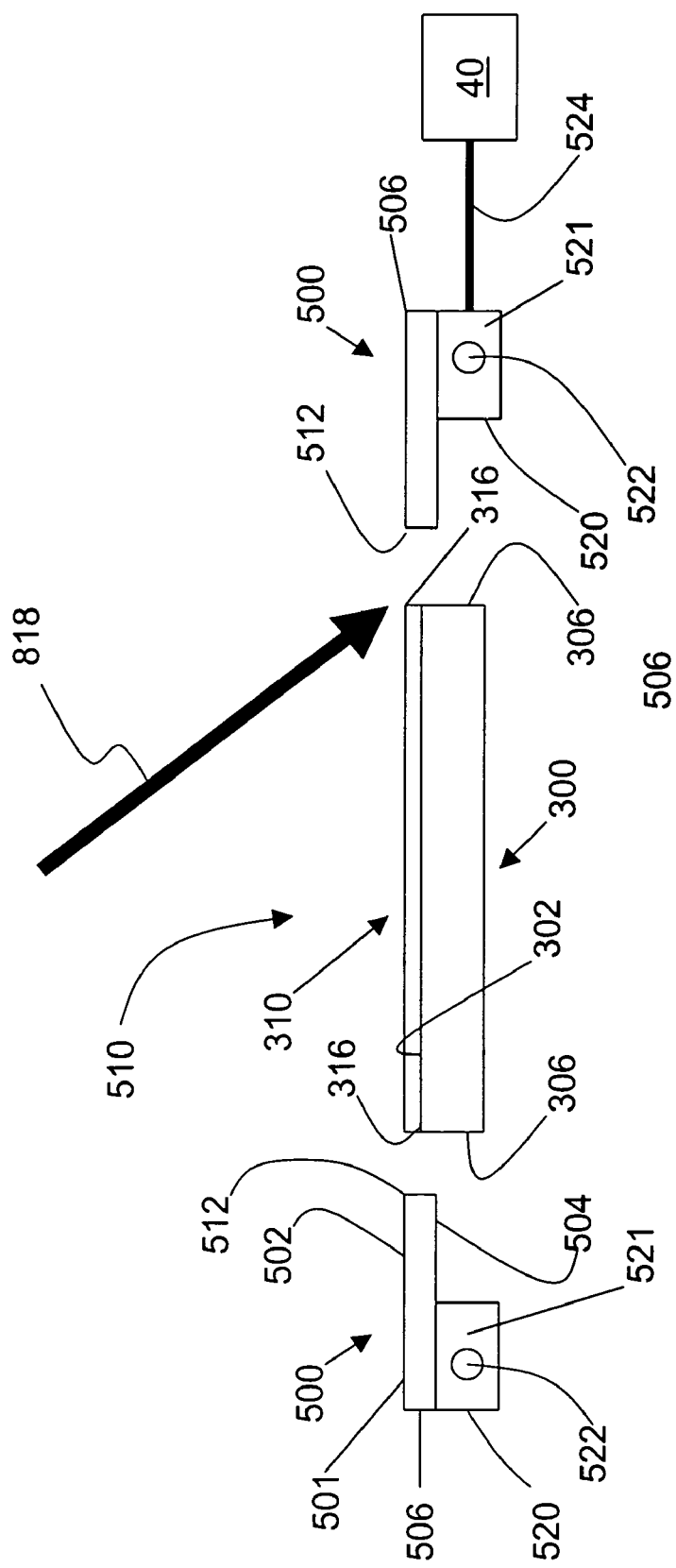
FIG. 5 is a close-up cross-sectional view of an example embodiment of the top plate of the chuck of FIG. 2, surrounded by a protective skirt.

FIG. 5 is a partial cross-sectional slice of another example embodiment of chuck 10 showing top plate 300 (FIG. 2) surrounded by a skirt 500. Skirt 500 is arranged around perimeter 306 of top plate 300 to surround edge 316 of wafer 310 when the wafer is properly positioned on top plate upper surface 302.

In an example embodiment, skirt 500 includes a planar member 501 having opposing upper and lower surfaces 502 and 504, respectively, and an outside edge 506. Planar member also includes a central aperture 510 defined by an inside edge 512 and sized to closely fit around wafer 310. Planar member 501 is arranged relative to the other chuck componenet so that inside edge 512 resides immediately adjacent wafer edge 316 when the wafer is properly secured to top plate upper surface 302. In FIG. 5, skirt 500 is shown with a relative large displacement from wafer edge 316 for the sake of illustration.

In an example embodiment, skirt 500 includes a thermal-conducting ring 520 in thermal communication with (e.g., is attached to or otherwise in contact with) lower surface 504 of planar member 501 between inside edge 512 and outside edge 506. Ring 520 includes a body 521 with ring-shaped cooling channel 522 formed therein and that traverses the circumference of the ring. Cooling channel 522 is operably coupled to cooling unit 40 via a cooling line 524.

Skirt 500 is adapted to absorb and/or to reflect laser radiation from LTP laser beam 818 (discussed below) when the beam travels beyond outer edge 316 of wafer 310. Heat absorbed by skirt 500 is removed by a cooling fluid (e.g., water) flowing through cooling channel 522 and cooling line 524 by the operation of cooling unit 40 as directed by chuck controller 200. Skirt 500 prevents damage to other portions of the LTP system (not shown) and also avoids contamination of wafer 310 by preventing the LTP beam from ablating materials that would otherwise be accessible to the beam beyond the outside edge of the wafer.

Kinematic Mount

Figure 6:
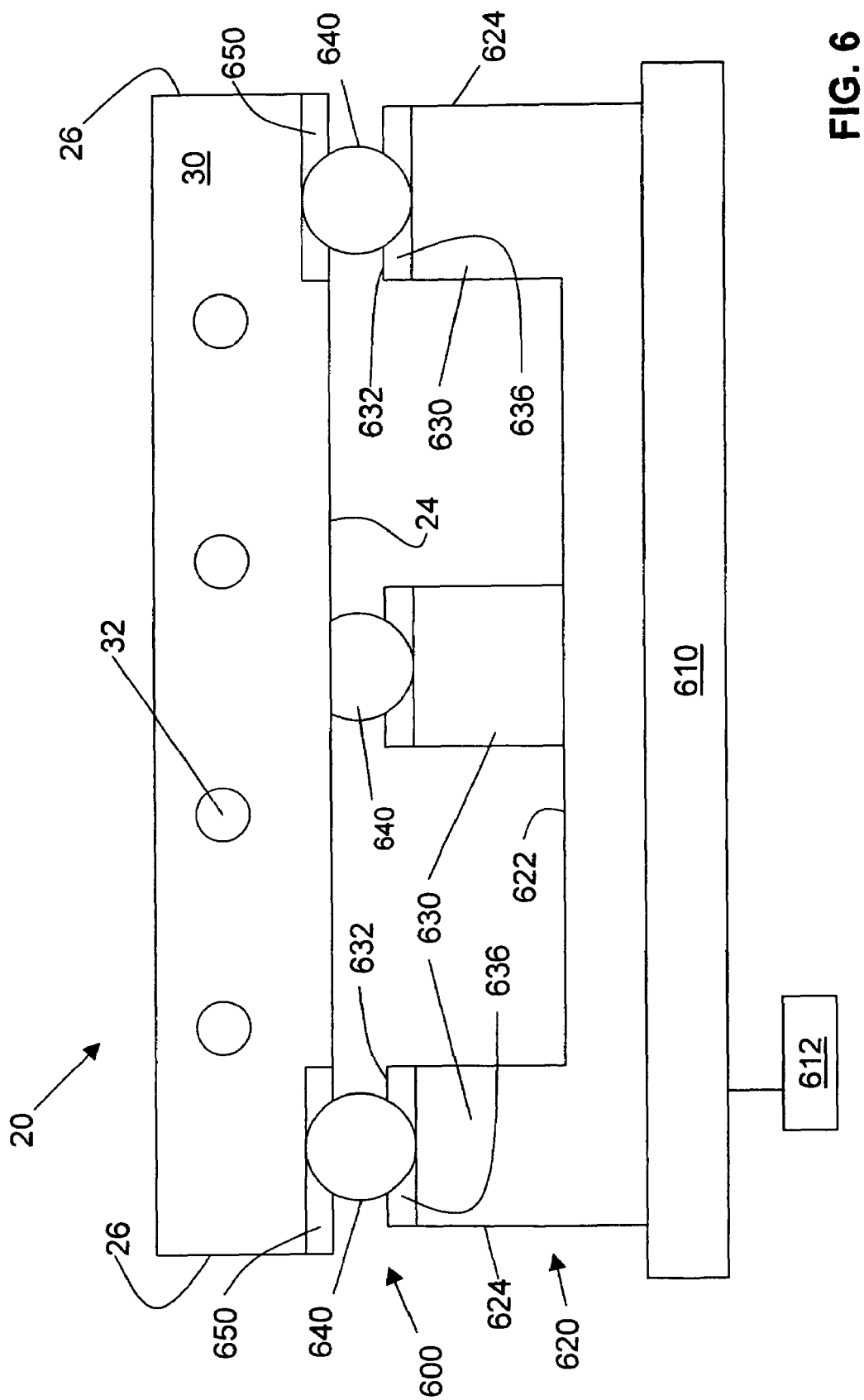
FIG. 6 is a close-up cross-sectional view of an example embodiment of the chuck of FIG. 2, further showing a kinematic mount formed in combination with the cooling plate and a stage interface member attached to a movable stage.

FIG. 6 is a close-up cross-sectional view of an example embodiment of the chuck illustrating how cooling plate 20 forms part of a kinematic mount 600 that supports the complete chuck. Kinematic mount 600 is adapted to allow the chuck to be precisely interfaced with a movable stage 610 that is operably coupled to and is driven by a stage driver 612.

Kinematic mount 600 includes a stage interface member 620 having a base portion 622 with an outer edge 624. Base portion 622 is secured to stage 610, e.g., via fastening screws (not shown). Stage interface member 620 also includes at or near outer edge 624 three symmetrically arranged upwardly extending pedestals 630 with two pedestals shown in full and the third pedestal partially visible, centered between the other two pedestals. Each pedestal has an upper mounting surface 632 that includes a radially-extending groove 636 sized to accommodate a portion of a mounting ball 640. Corresponding three radial grooves 650 are formed in lower surface 24 of cooling plate 20 near periphery 26 (only two grooves 650 are shown in this view—the third groove for the third pedestal is centered on the far side of cooling plate 20 between the two grooves shown to receive a third mounting ball 640 as shown in the other two grooves.

Kinematic mount 600 includes three mounting balls 640 each arranged in the corresponding three radial opposing grooves 636 and 650. The mounting balls 640 are permanently attached to either a corresponding pedestal or cooling plate grooves. Kinematic mount 600 allows for the chuck to be accurately and consistently positioned with respect to stage 610 by aligning cooling plate 20 with stage interface member 620 so that the mounting balls 640 reside in the corresponding opposing radial grooves.

Examples of Holding the Chuck Together

The main components of chuck 10 (i.e., the cooling plate, the insulator layer, and the heater module) can be held together by a variety of means. Two example embodiments of such means are discussed below.

Via Spring-Loaded Securing Bolts

Figure 7A:
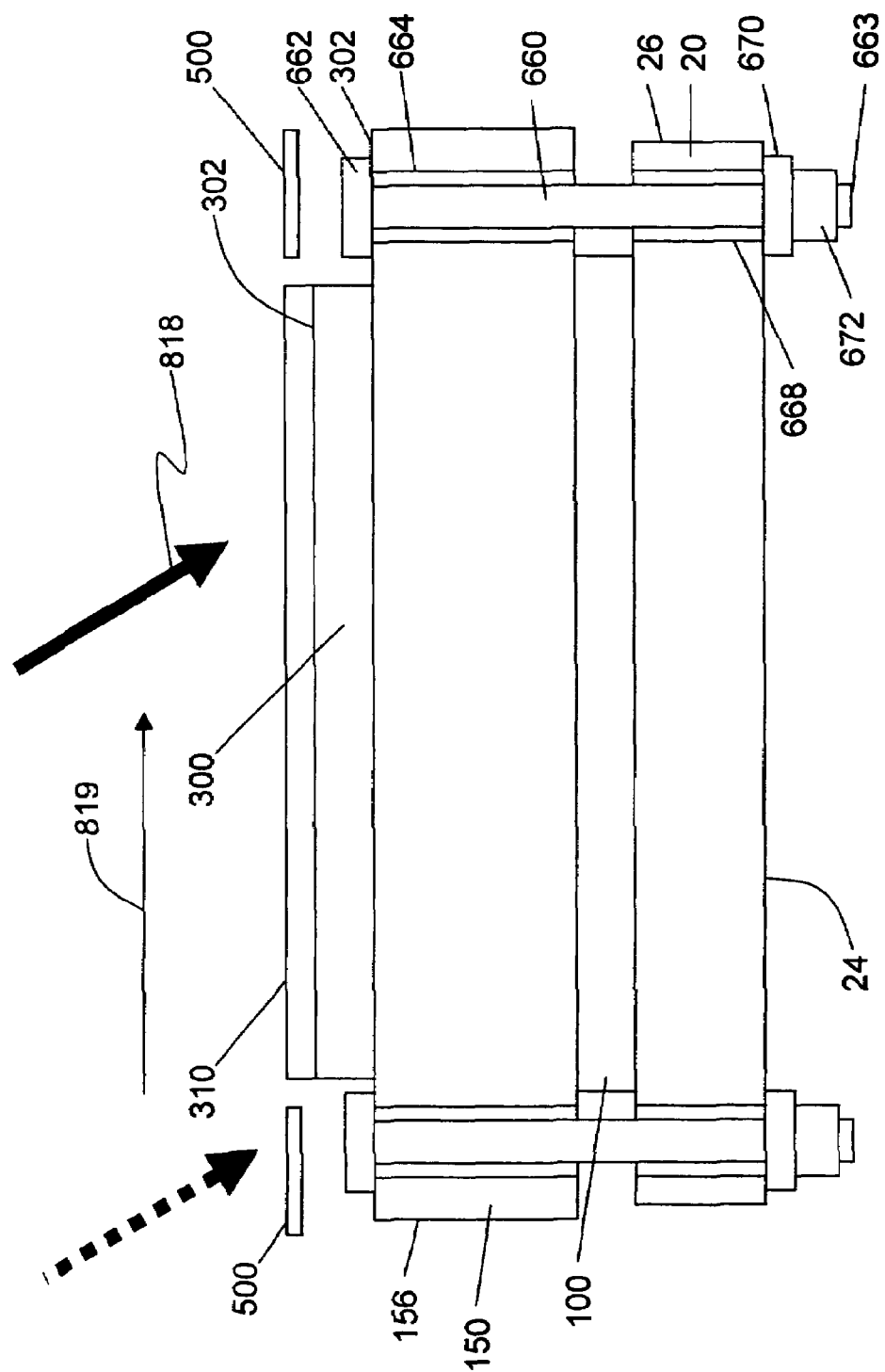
FIG. 7A is a schematic cross-sectional view of the chuck of the present invention, illustrating an example embodiment of how the chuck is held together by securing bolts.

FIG. 7A is a schematic side view of the chuck illustrating an example embodiment of how cooling plate 20, insulator layer 100, and heater module 150 are fastened together. The chuck of FIG. 7A includes bolts 660 (two shown with a third hidden on the far side) each with a head 662 at one end and threads 663 at the opposite end. Bolts 660 extend through holes 664 in the heater module 150 and holes 668 in cooling plate 20.

To facilitate fastening of the above-mentioned main chuck components, in an example embodiment periphery 156 of heater module 150 and periphery 26 of cooling plate 20 are made to extend beyond the periphery of insulator layer 100. Further, holes 664 and 668 are formed near periphery 156 and 26 so that fastening bolts 660 only extend through the heater module and the cooling plate and not the insulating layer.

In an example embodiment, bolts 660 are inserted through holes 664 and 668 with threaded ends 663 extending through cooling plate 20. Bolts 660 are then secured at threaded ends 663 with spring-load washers 670 (e.g., Belleville washers) and nuts 672 at lower surface 24 of cooling plate 20. This arrangement provides a spring load, which holds together the cooling plate, insulator layer, and heater module while allowing for low-stress expansion and contraction of these elements (e.g., due to temperature changes and their dissimilar coefficients of thermal expansion).

Also included in the example embodiment of chuck 10 of FIG. 7A is skirt 500 arranged adjacent wafer 310. Skirt 500 serves to protect the portions of the chuck, including bolt heads 662, from being irradiated with scanned LTP laser beam 818 (which traverses the wafer as illustrated by arrow 819).

Via Vacuum

Figure 7B:
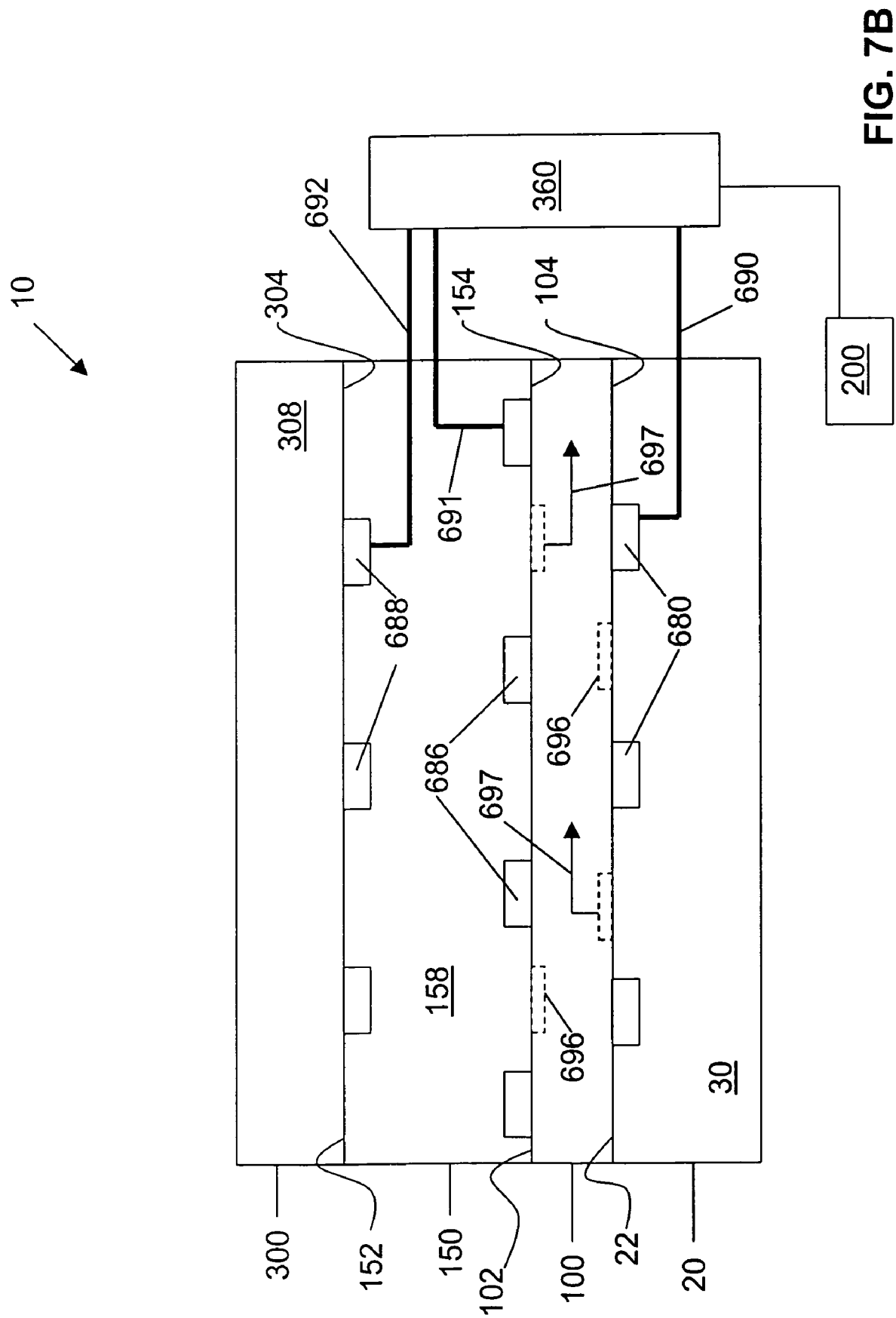
FIG. 7B is a schematic cross-sectional view of an example embodiment of the chuck of the present invention, wherein the chuck is held together by a vacuum.

FIG. 7B is a cross-sectional diagram of an example embodiment of chuck 10 of FIG. 2, wherein the main components of the chuck are held together using a vacuum. In chuck 10 of FIG. 7B, cooling plate 20 includes vacuum grooves 680 formed in upper surface 22. Also, heater module 150 includes vacuum grooves 686 and 688 formed in lower and upper surfaces 154 and 152, respectively. Vacuum grooves 680, 688 and 686 are pneumatically coupled to vacuum system 360 via respective vacuum lines 690, 691 and 692.

The activation of vacuum system 360 creates a suction between cooling plate 20 and insulator layer 100 via vacuum line 690 and vacuum grooves 680. The suction creates a vacuum that clamps these two components together. Likewise, vacuum system 360 creates a suction between insulator layer 100 and heater module 150 via vacuum line 691 and grooves 686. The suction clamps these two components together. Further, vacuum system 360 creates a suction between heater module 150 and top plate 300 via vacuum line 692 and grooves 688. The suction clamps these two elements together.

The present invention includes other example embodiments of securing the chuck components together by vacuum. For example, one or both of the upper and lower insulator layer surfaces 102 and 104 may include vacuum grooves 696 (dashed lines) formed therein and pneumatically coupled to vacuum system 360 via vacuum lines 697. Also, vacuum grooves may be formed in the top plate lower surface (e.g., vacuum grooves 342 of FIG. 3). Generally, any of the component surfaces 22, 104, 102, 154, 152, 304 and 302 can have vacuum grooves that are operably coupled to vacuum system 360 so that the above-mentioned main chuck components can be held together by a vacuum.

In an example embodiment, cooling plate 20, insulator layer 100 and heater module 150 are held together by bolts as described above, while the top plate is secured to the heater module via vacuum.

Lift-Pin Assembly

Figure 7C:
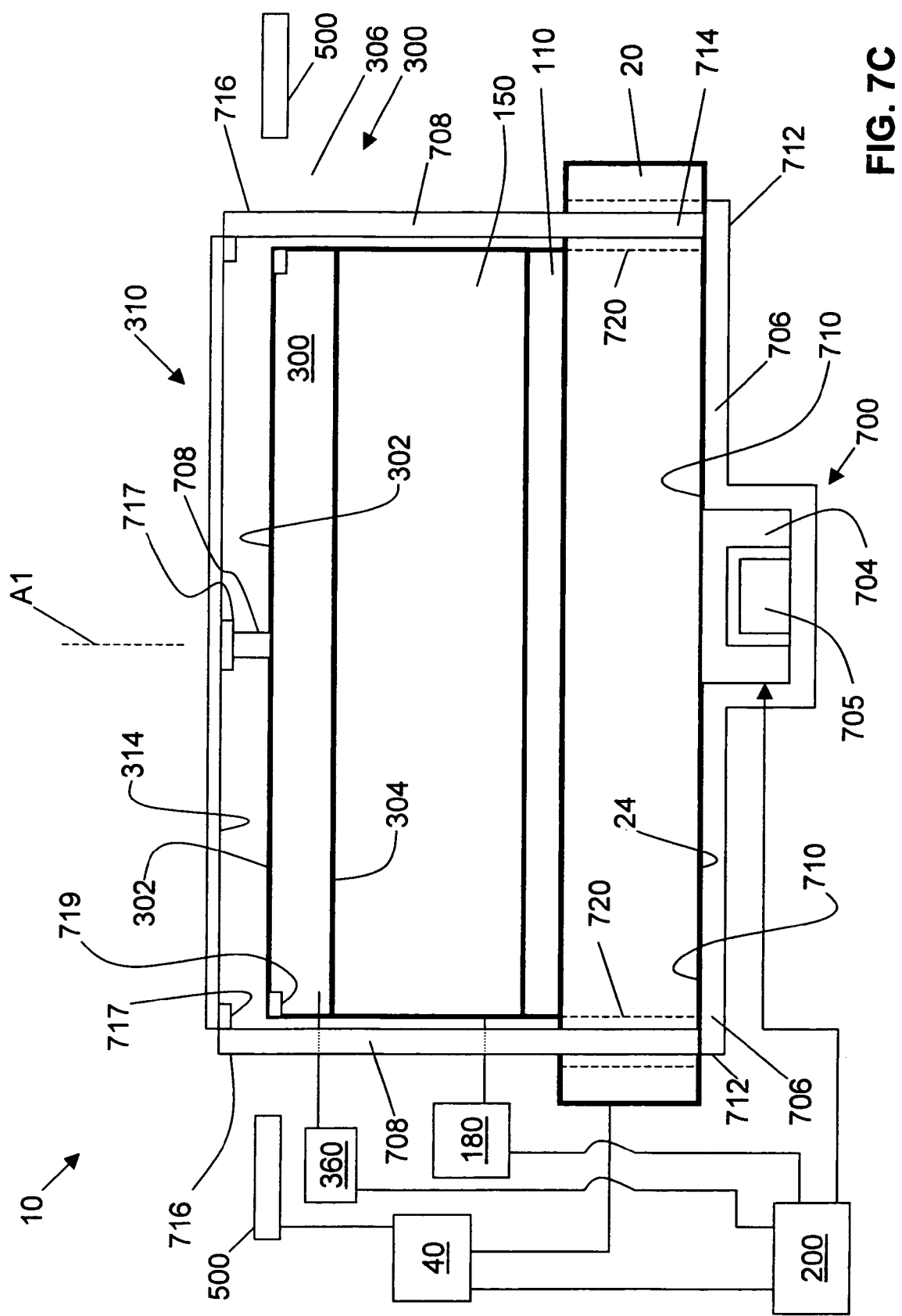
FIG. 7C is a cross-sectional view of an example embodiment of chuck of FIG. 2, further including a lift-pin assembly fixed to the lower surface of the cooling plate.

FIG. 7C is a cross-sectional view of an example embodiment of chuck 10 that includes a lift-pin assembly 700. In that example embodiment, lift-pin assembly 700 is fixed to lower surface 24 of cooling plate 20. Lift-pin assembly 700 includes a central drive unit 704 fixed to cooling plate 20 lower surface 24. Lift-pin assembly 700 also includes arms 706 that extend radially from piston 705 of central drive unit 704 that extends downward therefrom. Arms 706 can be axially raised and lowered in unison when piston 705 is driven by central drive unit 704. In the view shown in FIG. 7C, piston 705 is retracted into drive unit 704 placing arms 706 in the upmost position. In an example embodiment, lift-pin assembly 700 includes three arms 706 evenly spaced from each other around the chuck (two arms shown in full and the upper end of the third in the top center of FIG. 7C on the far side).

Each arm 706 includes an upper surface 710 and a distal end 712 at the farthest extent away from central drive unit 704. Lift-pin assembly 700 further includes lift pins 708 attached to respective arms 706 on upper surface 710 at or near end 712 and extend upwardly parallel to axis A1. Each lift pin 708 has a proximate end 714 that is attached to arm 706 and distal end 716 spaced apart from the proximate end. The distal end 716 includes a small inwardly extending radial lip 717 adapted to engage and support wafer 310 at lower surface 314. Likewise, top plate 300 upper surface 302 includes small radial recesses 719, each sized to accommodate one of radial lips 717 when the lift pins are in the "down" position.

Cooling plate 20 has holes 720 sized to accommodate lift pins 708 near proximate end 714 so that the latter can travel axially therethrough.

Central drive unit 704 is coupled to chuck controller 200, which coordinates the axial movement of piston 705, and in turn lifts pins 708 by selective activation of drive unit 704. In one operation, the actuation of drive unit 704 by controller 200 drives arms 706 upwardly (i.e., toward cooling plate 20 as shown in FIG. 7C), which causes lift-pins 708 to lift wafer 310 from top plate upper surface 302, as is shown in FIG. 7C in the "up" position. In another operation, the actuation of drive unit 704 serves to drive arms 706 downwardly, which causes lift pins 708 to set a raised wafer 310 upon top plate 300 upper surface 302. This is the "down" position, i.e., piston 705 extended downward by drive unit 704 (not shown in FIG. 7C).

Kinematic Mount Lift-Pin Assembly

When the kinematic mount of FIG. 6 is combined with the lift-pin assembly of FIG. 7C there are two options with respect to the orientation of pedestals 630 in relation to arms 706. In one embodiment, the view in FIG. 7C is rotated horizontally so that each of arms 706 and corresponding lift-pin 708 are positioned between two different pair of pedestals 630 of FIG. 6. This can be easily visualized by thinking of arms 706 being "rays" that extend outward from central drive unit 704 with space between each of the "rays". Thus, when assembled, arms 706 and pedestals 630 will not interfere with each other. Typically in a three arm-three pedestal assembly each of arms 706 with lift pins 708 will be spaced 1200 from each other, and pedestals 630 will be spaced 120° from each other, with a spacing of 60° between each adjacent arm 706 with lift-pin 708 and pedestal 630.

In a second embodiment, if pedestals 630 are spaced a distance "x" from the center axis A1 of chuck 10, and the length of arms 706 from center axis A1 of chuck 10 is less than "x", the angle relationship between the pedestals and arms-lift-pins is not critical thus allowing any angular positioning between them that best meets the mechanical design of the assembled unit.

LTP System

Figure 8:
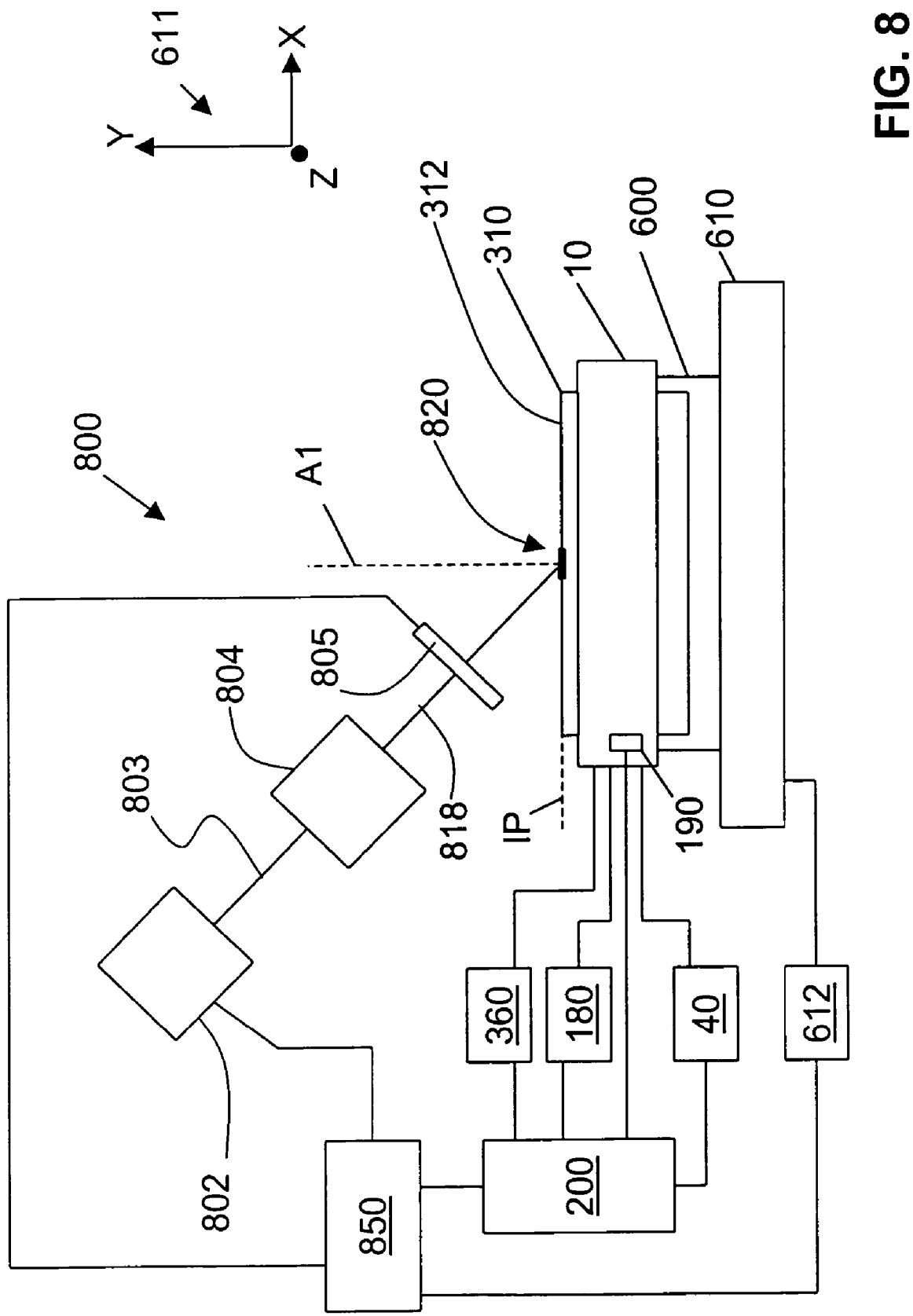
FIG. 8 is a schematic diagram of an LTP system such as that described in the '245 Patent employing the chuck of the present invention.

FIG. 8 is a schematic diagram of an LTP system 800, such as that described in the '245 Patent. LTP system 800 includes a laser source 802 that emits laser radiation 803. System 800 also includes an LTP optical system 804 optically coupled to laser source 802. LTP optical system 804 is also optically coupled to wafer 310 which is supported by chuck 10 at an image plane IP of the LTP optical system. In FIG. 8, skirt 500 is omitted for the sake of illustration.

LTP system 800 also includes stage 610, which is adapted to movably support the chuck using, for example, kinematic mount 600 (FIG. 6), described above. In an example embodiment, image 820 is scanned over wafer upper surface 312 by moving stage 610 in the Z-direction, as indicated by coordinate system 611.

LTP system 800 includes a main controller 850 that is operably coupled to laser source 802, stage driver 612, and chuck temperature controller 200. Chuck controller 200 is in turn operably coupled to cooling unit 40, power supply 180, vacuum system 360, and to the one or more thermocouples in thermal communication with heater module 150 (FIG. 2).

LTP System Operation

In an example embodiment of the operation of LTP system 800 of FIG. 8, wafer 310 is placed on upper surface 302 of top plate 300. In an example embodiment, this is accomplished by main controller 850 directing chuck controller 200 to activate central drive unit 704 so that lift pins 708 can receive and support wafer 310 via lips 717 at lift pin ends 716 (FIG. 7C), and then lower the wafer onto top plate 300 upper surface 302 (FIG. 2).

Main controller 850 then directs controller 200 to activate vacuum system 360 to vacuum-secure wafer 310 to top plate upper surface 302. This also serves to promote thermal conduction between the wafer and the top plate. In an example embodiment, the activation of vacuum system 360 also serves to secure top plate 300 to heater module 150 and promote thermal conduction between the top plate and the heater module.

Once wafer 310 is secured to top plate 300 (or prior thereto), chuck controller 200 activates cooling unit 40 to initiate the flow of a cooling fluid through cooling channel 32 of cooling plate 20 and through cooling channel 522 of thermal conducting ring 520 of skirt 500 (FIG. 5).

Also, chuck controller 200 activates power supply 360 to provide electrical power to heater module 150 to initiate heating of the heater module to bring the wafer up to a constant background temperature TC, as described in greater detail below.

Once the wafer reaches the constant background temperature TC, main controller 850 activates laser source 802 to generate laser radiation 803. In an example embodiment, laser source 802 operates continuously to prevent temperature changes in the laser system and beam-forming optics that cause the output power level to fluctuate for some period of time. The laser beam is switched off and on with a high-speed shutter 805 arranged between LTP optical system 804 and wafer surface 312. High-speed shutter 805 is operably coupled to main controller 850 and is switched in a manner that prevents the edge of the wafer from being exposed to LTP laser beam 818.

LTP optical system 804 receives laser radiation 803 and forms therefrom an LTP laser beam 818 that in turn forms an image 820 (e.g., an elongate image, such as a narrow line image) at image plane IP. Main controller 850 controls stage driver 612 to move the stage so that wafer 310 is moved relative to image 820. The result is that image 820 is scanned over wafer surface 312.

Main controller 850 also communicates with chuck controller 200 to receive information concerning the state of chuck 10, such as the temperature of heater module 150, the operational state of cooling unit 40, the operational state of power supply 180, and the operation state of vacuum system 360. Chuck controller 200 also reduces the amount of power supplied to heater module 150 to maintain the heater module at the constant background temperature TC when additional heat is added to the wafer during irradiation by LTP laser beam 818, as explained further below.

Operation of the Chuck

One of the key roles of chuck 10 is to manage the heat balance during LTP so that the background wafer temperature TC remains constant and uniform whether or not the LTP laser beam is irradiating the wafer. The operation of chuck 10 in performing this function is explained in detail below.

Maintaining TC without LTP Laser Beam Irradiation

Figure 9A:
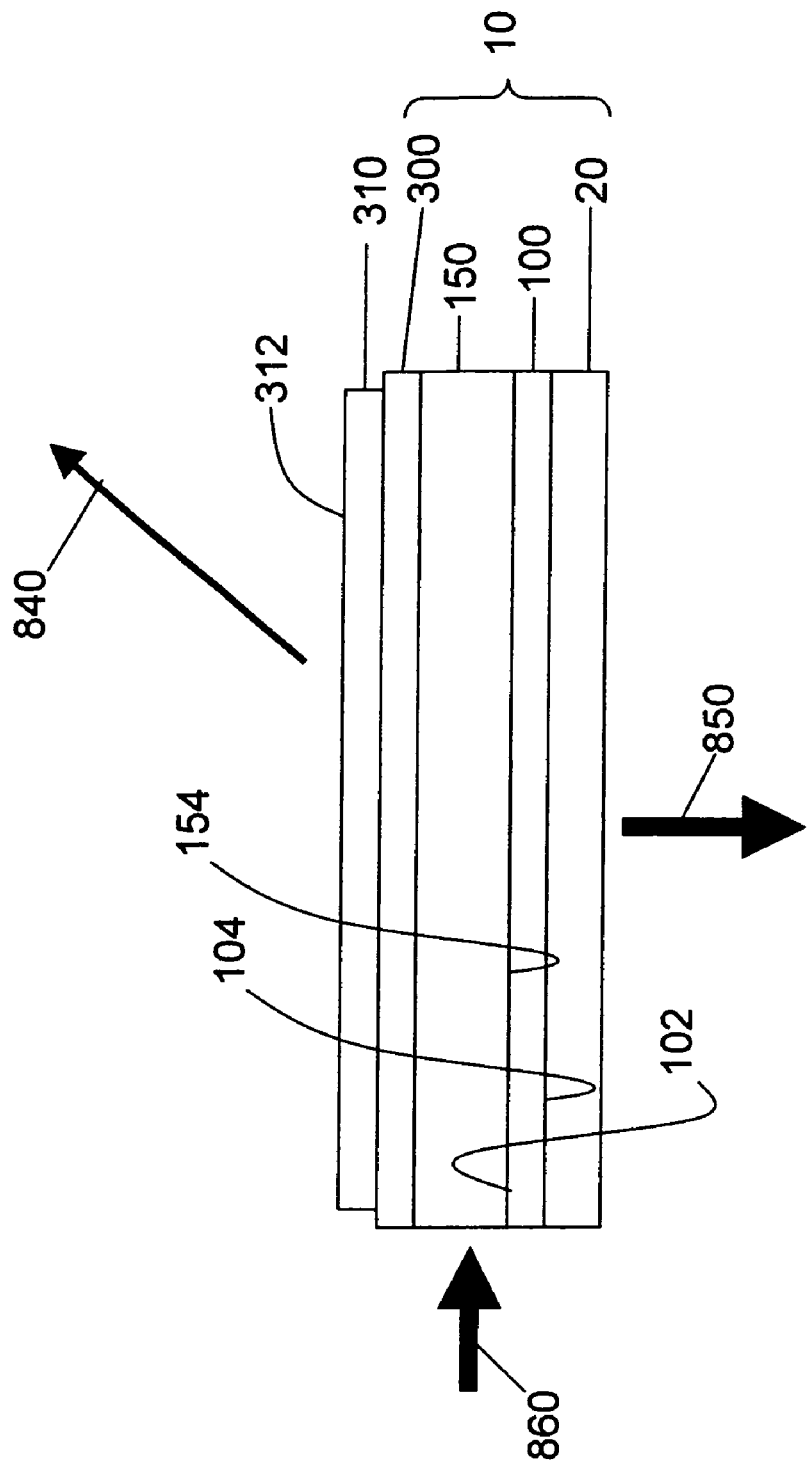
FIG. 9A is a schematic side view of the chuck and wafer of FIG. 2, illustrating the power fluxes present when the wafer is not being irradiated with the LTP laser beam from the LTP system of FIG. 8.

FIG. 9A is a schematic side view of chuck 10 and wafer 310, illustrating the power fluxes present when the wafer is not being irradiated with LTP laser beam 818 (FIG. 8). Prior to irradiating the wafer with LTP laser beam 818, wafer 310 is brought up to background temperature TC to facilitate the annealing process, such as the activation of dopants in the wafer.

In the absence of heating from LTP laser beam 818, power supply 180 needs to provide enough electrical power 860 to heater module 150 to heat the module and thus the wafer to the background temperature TC. Chuck controller 200 monitors the temperature of heater module 150 via temperature probes 190 (FIG. 2) and controls the amount of electrical power 860 delivered to the heater module in order to establish and maintain the desired constant background temperature TC.

Without the input of heat to the wafer from LTP laser beam 818, the main sources of heat loss from the chuck are by radiation and convection 840 through the wafer upper surface 312, and by conduction 850 through insulator layer 100 to cooling plate 20. Chuck controller 200 controls cooling unit 40 and thus the flow of a cooling fluid (e.g., water) through cooling plate 20 to promote the dissipation of heat by the cooling plate.

As discussed above, insulator layer 100 is adapted to support a substantially constant (i.e., constant or near-constant) thermal gradient ranging from the constant background temperature TC (e.g., about 400° C.) at upper surface 102 to a significantly lower temperature (e.g., 20° C.) at lower surface 104. Insulator layer 100 suppresses radiative thermal transport from lower surface 154 of heater module 150 to cooling plate 20 while allowing conductive thermal transport from the heater module to the cooling plate.

In an example embodiment, heater module 150 requires about 3.4 KW of power 860 in order to maintain wafer 310 at constant background temperature TC of 400° C. when the wafer is not being irradiated with LTP laser beam 818.

Maintaining TC with LTP Laser Beam Irradiation

Figure 9B:
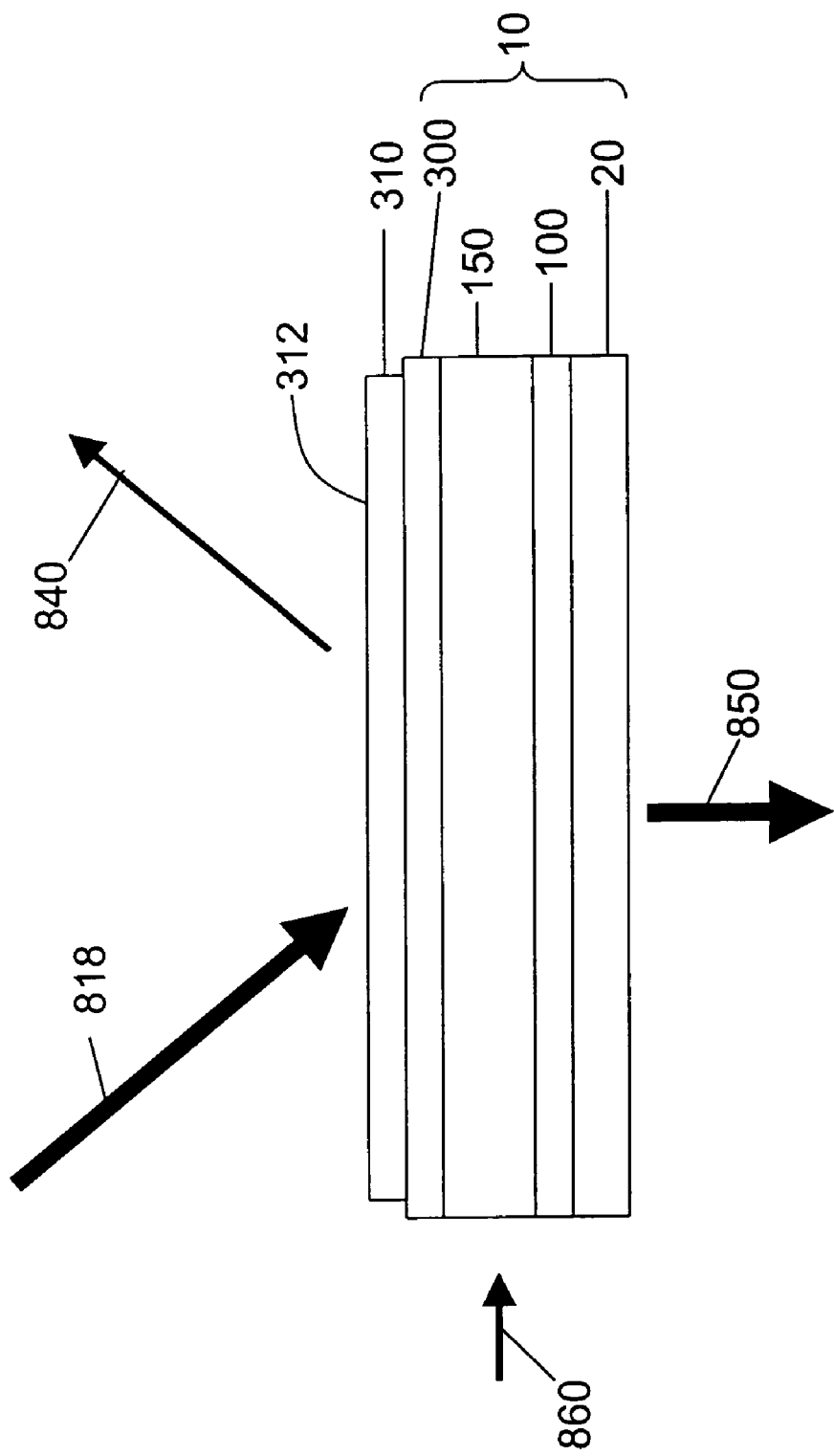
FIG. 9B is a schematic side view of the chuck and wafer of FIG. 2, illustrating the power fluxes present when the wafer is irradiated with the LTP laser beam from the LTP system of FIG. 8.

FIG. 9B is a schematic side view of chuck 10 and wafer 310, illustrating the power fluxes present when the wafer is irradiated with LTP laser beam 818. In an example embodiment, LTP laser beam 818 adds about 3 kW of power, while the radiative and convective power loss 840 (FIG. 9A) is about 0.5 kW. This can be balanced, by dumping 3 kW of power 850 to the cooling plate, while inputting 0.5 kW of electrical power 860 to the heater module 150 via power supply 180 (FIG. 8).

When LTP laser beam 818 is incident on wafer surface 312, the power 850 provided by electrical power supply 180 to heater module 150 is proportionally reduced. To maintain electrical control of the constant background temperature TC, the steady state heat loss through insulator layer 100 to cooling plate 20 needs to be greater than the maximum input power from LTP laser beam 818 less the loss through radiation and convection.

The adaptive abilities of the heating control system for chuck 10 accommodates the widely varying power input levels of the laser and provides a constant average temperature at the wafer TC. Compensation of the spatially varying heat load provided to the wafer by scanned laser beam 818, is achieved passively by the high conductivity of the heater module and the top plate. The low thermal interface resistance between the wafer and the top plate and the top plate and the heater module also assists in reducing spatial non-uniformities in temperature.

Example LTP Scan Path

When performing LTP, it is preferred to avoid local temperature variations in wafer 310, such as those that occur when adjacent scans of image 820 (FIG. 8) occur too soon.

Figure 10:
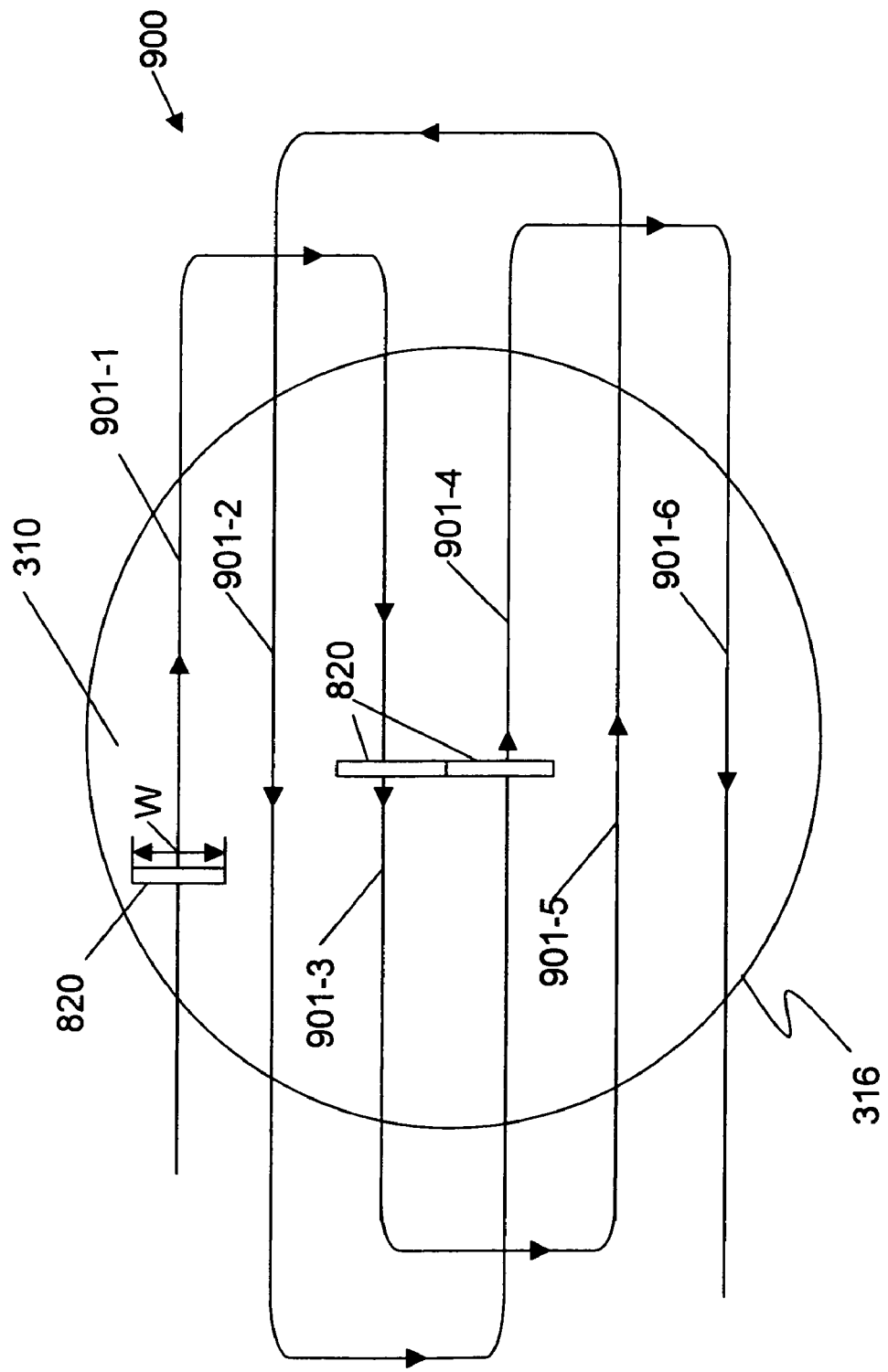
FIG. 10 is a schematic plan diagram of a wafer in the LTP system of FIG. 8, illustrating an example embodiment of an interleaved scan path for scanning the LTP laser beam image over the wafer upper surface.

FIG. 10 is a schematic plan top view of wafer 310 illustrating an example embodiment of a scan path 900 for image 820. Image 820 has an image width W as measured perpendicular to the scan path. As mentioned above, an example embodiment, image 820 is elongate, e.g., is a line image. Scan path 900 includes a number of scan segments 901 (i.e., 901-1, 901-2, ... 901-6). The arrows in each scan segment indicate the course of the scan path. The scan path denotes the path taken by the center of image 820 over the wafer surface.

In an example embodiment, successive scan segments 901 are kept well separated to avoid temperature perturbations from the previous scan segment. In a preferred embodiment, the spacing between adjacent scan segments is greater than the width W of image 820, as illustrated in FIG. 10. Once the first scan sequence is completed a second one is started that is interleaved with the first one that allows for the scanned images 820 to butt up against one another. In an example embodiment, the spacing between adjacent (butted) scans is arranged so that the maximum variation in peak intensity seen by any point on the wafer is the order of 1%, the exception being a narrow exclusion zone bordering the edge of the wafer. The second scan sequence might be followed by additional sequences of scans until the full wafer is completely covered by tightly butted scans. Thus the entire wafer is uniformly processed by the LTP laser beam.

Note that in scan path embodiment of FIG. 10, the sequence of scans 901 provides sufficient time for heat to dissipate in one scan segment (i.e., for the wafer temperature at the scan segment to return to the constant background temperature TC) before the immediately adjacent segment is scanned.

Operation of Protective Skirt

The LTP scan paths, such as the example scan path 900 of FIG. 10, traverse the outer edge 316 of wafer 310. For such scan paths, skirt 500 serves to absorb and/or reflect radiation from the LTP laser beam 818 as it moves beyond the wafer. In the example embodiment of skirt 500 illustrated in FIG. 7A, the power from LTP laser beam 818 that is absorbed by planar member 501 is conducted to thermal conducting ring 520, which removes the heat from the skirt via the flow of a cooling fluid (e.g., water) from cooling unit 40 through cooling channel 522.

The many features and advantages of the present invention are apparent from the detailed specification, and, thus, it is intended by the appended claims to cover all such features and advantages of the described apparatus that follow the true spirit and scope of the invention. Furthermore, since numerous modifications and changes will readily occur to those of skill in the art, it is not desired to limit the invention to the exact construction and operation described herein. Accordingly, other embodiments are within the scope of the appended claims.

What is claimed is:

1. A chuck apparatus disposed to retain and maintain a wafer at a constant background temperature uniformly as different localized regions of the wafer receive selective varying radiation levels from a radiation source over different times, the chuck apparatus comprising:
   a heat sink;
   a heater module in thermal communication with a lower surface of the wafer to provide and maintain the constant background temperature to the wafer over all time whether or not said radiation source is irradiating said wafer at any instant in time; and
   a thermal insulator layer arranged between, and in thermal communication with both an upper surface of the heat sink and a lower surface of the heater module, the thermal insulator layer to provide and maintain a selected thermal gradient between the heater module and the heat sink.

2. The chuck apparatus of claim 1:
   wherein the radiation source comprises a laser;
   said apparatus further includes a power supply electrically coupled to said heater module to provide sufficient power thereto to maintain the wafer at said constant background temperature; and
   wherein a power level from the power supply to the heater module and the thermal gradient of the thermal insulator are selected so that the heat loss through the thermal insulator to the heat sink exceeds heat from the laser at a maximum input power less an amount of heat lost by thermal radiation and convection.

3. The chuck apparatus of claim 1, further includes a top plate having an upper surface and a lower surface with said lower surface in thermal communication with an upper surface of the heater module and the upper surface of the top plate disposed to receive and support the wafer and to conduct heat between the wafer and the heater module.

4. The chuck apparatus of claim 3, wherein the top plate is an oxide layer formed on the upper surface of the heater module.

5. The chuck apparatus of claim 1, wherein the heat sink includes a cooling channel formed therein disposed to receive the flow of a cooling fluid therethrough.

6. The chuck apparatus of claim 5, wherein the heat sink is made of aluminum.

7. The chuck apparatus of claim 1, further includes:
   one or more temperature probes each arranged to detect a temperature of the heater module at corresponding one or more locations of the heater module and generate corresponding one or more temperature signals; and
   a power supply electrically coupled to the heater module to provide selected amounts of electrical power to the heater module in response to the one or more temperature signals.

8. The chuck apparatus of claim 7, further includes a controller operably coupled to the power supply and the one or more temperature probes, the controller disposed to receive the one or more temperature signals and in response to the one or more temperature signals to cause the power supply to provide the selected amounts of electrical power to the heater module.

9. The chuck apparatus of claim 7, wherein the heater module includes a heating unit formed therein, the heating unit being electrically coupled to the power supply to receive the selected amounts of electrical power therefrom to provide uniform heating of the heater module in response thereto.

10. The chuck apparatus of claim 1, wherein the thermal insulator layer is quartz.

11. The chuck apparatus of claim 3:
   wherein the top plate includes a perimeter and the wafer includes an outer edge and the chuck apparatus further includes:

a skirt surrounding the perimeter of the top plate to absorb and/or reflect radiation from an LTP laser beam incident thereon.

12. The chuck apparatus of claim 11:
wherein the skirt is heat conductive and includes a cooling channel; and
the chuck apparatus further includes a cooling unit coupled to the cooling channel to flow a cooling fluid through the cooling channel to cool the skirt.

13. The chuck apparatus of claim 11, wherein the skirt is molybdenum.

14. The chuck apparatus of claim 3:
wherein the upper surface of the top plate has first vacuum grooves defined therein; and
the chuck apparatus further includes a vacuum system coupled to the first vacuum grooves to create suction between the upper surface of the top plate and the wafer when in place thereon that acts to secure the wafer to upper surface of the top plate.

15. The chuck apparatus of claim 14, wherein the lower surface of the top plate has second vacuum grooves defined therein coupled to the vacuum system to create suction between the lower surface of the top plate and the upper surface of the heater module that acts to secure the top plate to the heater module.

16. The chuck apparatus of claim 3, wherein the top plate includes one or more materials selected from the group of materials comprising: fused silica, silicon, silicon carbide, aluminum oxide, and porous silicon carbide.

17. The chuck apparatus of claim 3:
wherein the top plate includes:
a body portion that defines the upper surface and the lower surface of the top plate with a recess formed in the body portion at the upper surface thereof; and
a material fill in the recess, the material fill being porous to air and having an upper surface that is co-planar with the upper surface of the body portion; and
the chuck apparatus further includes a vacuum system coupled to the material fill to create suction therein and between the upper surface of the material fill and the wafer when in place on the top plate to secure the wafer to the top plate.

18. The chuck apparatus of claim 17, wherein the material fill is porous silicon carbide, and the body portion is non-porous silicon carbide.

19. The chuck apparatus of claim 3:
wherein the top plate is formed from a material porous to air; and
the chuck apparatus further includes a vacuum system coupled to the material of the top plate to create suction at the upper and lower surfaces of the top plate.

20. The chuck apparatus of claim 3:
wherein the top plate includes:
a central disk of a material porous to air, the central disk having a periphery and upper and lower surfaces that coincide with the upper and lower surfaces of the top plate; and
a non-porous body in the form of a ring that surrounds the central disk and is fixed to the central disk at the disk periphery; and
wherein the material porous to air of the central disk is capable of delivering suction to the upper and lower surfaces of the central disk when a vacuum is applied to the material.

21. The chuck apparatus of claim 20 further includes a vacuum system coupled to the central disk to provide a vacuum thereto.

22. The chuck apparatus of claim 3 wherein the top plate includes:
upper and lower sections formed from respective first and second materials each porous to air and capable of delivering respective suctions to the upper and lower surfaces, respectively, of the top plate when a vacuum is applied to the upper and lower sections; and
a barrier layer that is non-porous to air between and separating the upper and lower sections.

23. The chuck apparatus of claim 22 further includes a vacuum system coupled to the upper and lower sections, respectively, to provide a vacuum to each individually.

24. The chuck apparatus of claim 22, wherein the first and second materials are of the same composition.

25. The chuck apparatus of claim 22, wherein the first and second materials each include porous silicon carbide.

26. The chuck apparatus of claim 1 to interface the chuck apparatus to a multi-axis movable stage further includes a kinematic mount comprising:
a stage interface member having a base portion with an outer edge, and three upwardly extending pedestals arranged at the outer edge of the stage interface member, with each pedestal including an upper mounting surface with a radially oriented groove formed therein and sized to accommodate a portion of a mounting ball; and
three mounting balls attached to a lower surface of the heat sink at each of three positions disposed to corresponding to the grooves formed in each pedestal of the stage interface member.

27. The chuck apparatus of claim 1, wherein the heater module is made of aluminum.

28. The chuck apparatus of claim 5 further includes a cooling unit connected to the cooling channel of the heat sink to deliver flowing cooling fluid thereto to remove heat from the heat sink.

29. The chuck apparatus of claim 3:
wherein the heat sink has a lower surface opposing the upper surface and an outer edge that extends between the upper and lower surfaces thereof with a plurality of holes defined therethrough extending from the lower surface to the upper surface adjacent the outer edge thereof; and
the chuck apparatus further includes a lift-pin assembly arranged adjacent the lower surface of the heat sink with the lift-pin assembly having a plurality of movable lift pins that extend through the holes in the heat sink with a distal end of the lift pins extending to the wafer disposed to selectively lift and support the wafer away from, and lower and place the wafer on, the upper surface of the top plate.

30. The chuck apparatus of claim 3, further includes a thermally conductive interface layer arranged between one or more of:
a) the heat sink and the thermal insulator layer; and
b) the thermal insulator layer and the heater module.

31. The chuck apparatus of claim 30, wherein the thermally conductive interface layer is a flexible graphite sheet.

32. The chuck apparatus of claim 3, wherein the top plate is silicon with a coating of silicon oxide on the upper surface thereof.

33. The chuck apparatus of claim 3, wherein the top plate is silicon with a coating of silicon nitride on the upper surface thereof.

34. The chuck apparatus of claim 1, wherein:
the heat sink has an upper surface and a lower surface and defines a plurality of through-holes that extend through the upper and lower surfaces thereof;

the heater module has an upper surface and a lower surface and defines a corresponding plurality of through-holes that extend through the upper and lower surfaces thereof axially in line with the through-holes defined through the heat sink; and a corresponding plurality of bolts each having a threaded end and passing through the heater module through-holes and the heat sink through-holes, with each bolt being secured at each threaded end with a spring-loaded washer and a nut to spring load together the heater module, the thermal insulator layer and the heat sink.

35. The chuck apparatus of claim 34, wherein none of the bolts passes through the thermal insulator layer.

36. The chuck apparatus of claim 3:

wherein the heat sink has an upper surface, the thermal insulator layer has opposing upper and lower surfaces, and the heater module has a lower surface opposing the upper surface; and the apparatus further includes:

first vacuum grooves defined in one of the upper surface of the heat sink and the lower surface of the thermal insulator layer;

second vacuum grooves defined in one of the upper surface of the thermal insulator layer and the lower surface of the heater module;

third vacuum grooves defined in one of the upper surface of the heater module and the lower surface of the top plate; and a vacuum system pneumatically coupled to the first, second and third vacuum grooves to create suction to hold the heat sink, thermal insulator layer, heater module and top plate together.

* * * * *